US012288098B2

(12) United States Patent
Murphy

(10) Patent No.: US 12,288,098 B2
(45) Date of Patent: Apr. 29, 2025

(54) DETECTING AND TESTING TASK OPTIMIZATIONS USING FRAME INTERCEPTION IN CONTENT GENERATION SYSTEMS AND APPLICATIONS

(71) Applicant: Nvidia Corporation, Santa Clara, CA (US)

(72) Inventor: Michael Murphy, Boston, MA (US)

(73) Assignee: Nvidia Corporation, Santa Clara, CA (US)

( * ) Notice: Subject to any disclaimer, the term of this patent is extended or adjusted under 35 U.S.C. 154(b) by 154 days.

(21) Appl. No.: 18/330,722

(22) Filed: Jun. 7, 2023

(65) Prior Publication Data

US 2024/0411607 A1 Dec. 12, 2024

(51) Int. Cl.
*G06T 1/20* (2006.01)
*G06F 9/50* (2006.01)

(52) U.S. Cl.
CPC .......... *G06F 9/5038* (2013.01); *G06F 9/5066* (2013.01); *G06T 1/20* (2013.01); *G06T 2215/16* (2013.01)

(58) Field of Classification Search
CPC ....... G06F 9/5038; G06F 9/5066; G06T 1/20; G06T 2215/16
See application file for complete search history.

(56) References Cited

U.S. PATENT DOCUMENTS

| | | | |
|---|---|---|---|
| 8,466,919 B1 * | 6/2013 | Duff | G06T 13/00 717/124 |
| 10,409,560 B1 * | 9/2019 | Bebee | G06F 8/4441 |
| 10,438,312 B2 * | 10/2019 | Cerny | G06T 1/60 |
| 10,579,650 B2 * | 3/2020 | Chaintron | H04L 41/0803 |
| 10,650,568 B2 * | 5/2020 | Holmes | G06T 11/40 |

\* cited by examiner

*Primary Examiner* — Corey S Faherty
(74) *Attorney, Agent, or Firm* — Hogan Lovells US LLP

(57) ABSTRACT

Approaches presented herein provide for the optimization of tasks performed for an operation such as the rendering of an image. A Frame Interceptor (FI) can generate a resource dependency graph (RDG) by intercepting API calls during the rendering process and determining dependencies. FI can analyze the RDG to identify potential optimizations, such as may correspond to reordering or parallel execution of certain tasks. FI can automatically test optimizations to determine whether sufficient improvement is obtained. This testing can be performed in real time by replacing the originally intercepted API calls with the newly ordered API calls generated by FI. FI can then issue a report that indicates information such as the changes made, the time taken to render the image, and potentially the fact that the images were determined to be identical.

20 Claims, 17 Drawing Sheets

DETECTING AND TESTING TASK OPTIMIZATIONS USING FRAME INTERCEPTION IN CONTENT GENERATION SYSTEMS AND APPLICATIONS

BACKGROUND

In various applications—such as generating image or video content, for example—it can be beneficial, if not necessary, to attempt to minimize (or at least reduce) the amount of resource usage and time needed to perform a set of tasks. In many instances, such an attempt is performed manually on an application trace, which is a sequence of API calls captured from the application, where an engineer might analyze various API calls and their resource usage to attempt to identify opportunities to improve execution time and resource utilization. This can be a very time consuming process that requires a significant amount of experience, such as to ensure that any changes do not negatively impact the output of the process, as may involve the quality of a rendered image. Assuming such a potential improvement is identified, the engineer must locate the exact lines of code among potentially tens of thousands of lines of code or more, and must move or modify those lines as needed. Because the code in a trace is often autogenerated, the code is very time-consuming and difficult to read, understand, and modify, which increases the probability that an error or bug will be introduced through manual editing. Once a modification is made, a profiling run can be performed to determine whether the change resulted in an improvement, and if so then the improvement can be reported to developers. If not, a number of hours of work have been wasted. Further, due to its cost, this level of manual testing has been reserved for only the highest priority operations, which means many lower-priority operations remain unimproved and thus unnecessarily consume compute (and related) resources.

BRIEF DESCRIPTION OF THE DRAWINGS

Various embodiments in accordance with the present disclosure will be described with reference to the drawings, in which.

DETAILED DESCRIPTION

Figure 1:
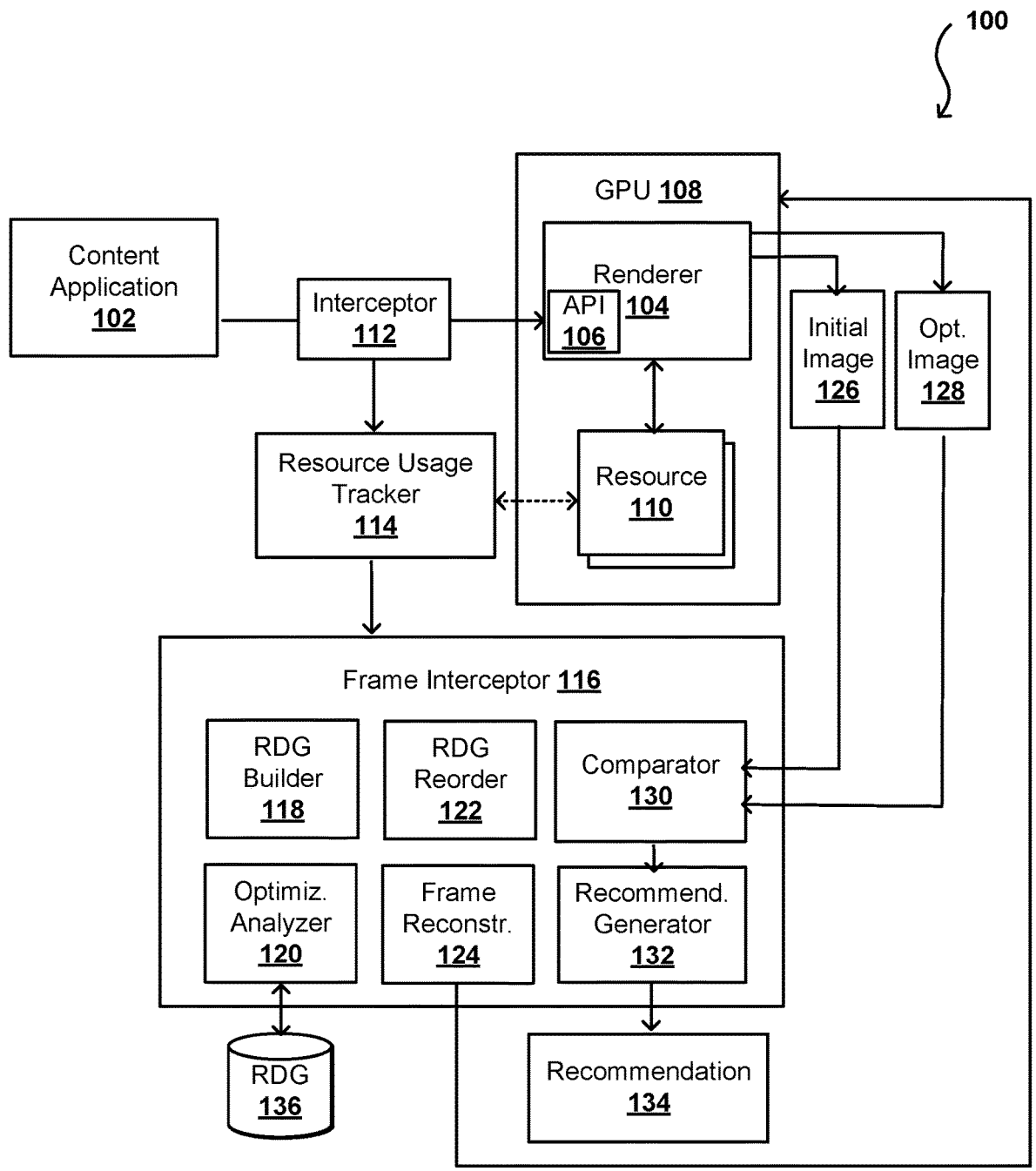
FIG. 1 illustrates an example system for optimizing and testing a plurality of tasks, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used to analyze and provide feedback for, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, generative AI with large language models (LLMs), light transport simulation (e.g., ray-tracing, path tracing, etc.), collaborative content creation for 3D assets, rendering of 2D or 3D images, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing generative AI operations using LLMs, systems for performing light transport simulation, systems for performing collaborative content creation for 3D assets, systems implemented at least partially using cloud computing resources, and/or other types of systems.

Approaches in accordance with various illustrative embodiments provide for the optimization of tasks performed for rendering an image, as may be used in a game or animation. An implementation of a Frame Interceptor-which may include, for example and without limitation, an application, a module, a system, a component, or a process (and henceforth referred to as an "FI")—can generate a resource dependency graph by intercepting API calls (such as by using hook function calls to go to a local version of a function) during the rendering process and determining the dependencies between them—such as where one task has a 'read' of the value from a 'write' of another task. An FI can build such a resource dependency graph in at least one embodiment by tracking the resources used for these calls and analyzing the ways each call uses them. An FI application can then automatically analyze the resource dependency graph to find potential optimizations, such as the removal or reordering of certain calls. One or more embodiments of an FI can be implemented using various heuristics to simplify and accelerate the search process for optimizations, such as by combining nodes in the resource dependency graph or by analyzing a subset (e.g., one, some, etc.) of many equivalent permutations of the graph. Once an FI has found potential optimizations, the FI can then automatically test the potential optimizations to determine whether the amount of time to render the frame using the optimized render graph is sufficiently reduced. This testing can be performed in real time by replacing the originally intercepted API calls with the newly ordered API calls generated by the FI. The FI can then issue a report to the user that indicates information such as the changes made to the frame, the time taken to render the new frame, and potentially the fact that the images were compared and the images before and after optimization were identical. In some embodiments some optimizations can be made automatically, while in other embodiments potential optimization opportunities are recommended for review and potential implementation by a developer.

FIG. 1 illustrates an example testing and optimization system 100, according to at least one embodiment. Such a system can be used to automatically detect and test optimizations, such as per-frame optimizations for a 3D graphics application in real time based, at least in part, on a corresponding resource dependency graph. In this example, a content application 102 makes a series of calls to at least one interface, such as an application programming interface (API) 106 of a renderer 104, such as may include a rendering application executing on a graphics processing unit (GPU) 108 in at least one embodiment. A series of API calls can be sent in a determined sequence to cause a corresponding sequence of tasks to be performed in order to perform a specific operation, such as to perform a sequence of individual tasks needed to render an image or video frame, among other such types of content. The sequence of tasks to be performed can be determined based at least in part on the dependencies between various tasks, such as where the output of a first task is required to be provided as input to a second task, such that the second task cannot be executed properly until after the first task has completed. In this example, the content application 102 can send a first sequence or stream of API calls that are received by an API 106 associated with the renderer 104, whereby a sequence of rendering tasks is executed on the GPU 108 using various GPU resources 110, such as data buffers, to produce an initial image 126.

As mentioned, this system can attempt to optimize the sequence of tasks used to render this image, such as to improve a rendering time and/or reduce an amount of resource capacity needed, while still producing an accurate image without degradation or other unacceptable variation. In this example system 100, an interceptor 112 is used to intercept the stream of API calls used to render the initial image 126. While an interceptor 112 is used in this example, other ways of routing or obtaining a copy of a series of calls, requests, or communications can be used as well in at least one embodiment. The interceptor 112 can cause a copy of the API calls to be transmitted to a resource usage tracker 114. The resource usage tracker 114 can analyze the sequence of calls to determine information such as the respective timing of the calls, as well as the resource(s) associated with the individual calls. In some embodiments, the resource usage tracker may obtain information about the resources 110, while in other embodiments the usage tracker 114 may rely on information extracted from the calls themselves. The resource usage tracker can then pass at least some of this information on to an optimization determination and testing application, such as a Frame Interceptor application (FI) 116.

In this example, FI 116 takes the information about the sequence of API calls and associated resources and generates a resource dependency graph (RDG) 136 using an RDG builder module 118 or process. An RDG can provide the ground truth for the order of execution, and thus can be used to ensure that correctness is maintained. Other representations can be used as well, as long as those representations allow for representation of dependencies between tasks performed by various API calls. A RDG in at least one embodiment can be a type of tree structure composed of nodes, where each node is a task and the edges between nodes define dependencies between tasks. The locations of the nodes in a graph are determined at least in part by the timing of the calls in the sequence. Examples of such an RDG 136 will be described with respect to FIGS. 2A-2C. In at least one embodiment, the resource dependency graph is constructed that was induced by the command list of the original image or frame. Once an RDG is generated for the image or frame, an optimization analyzer 120 can analyze the RDG to attempt to determine any and all possible optimizations. These optimizations may include, for example, reordering tasks, combining tasks, deleting unnecessary tasks or otherwise modifying the timing or positioning of nodes for those tasks in the RDG to be more efficient, while ensuring that the determined dependencies are respected in the optimized RDG. As will be discussed in more detail herein, this can include a second set of tasks that includes the same tasks but in a different ordering or sequence, or may include at least some different tasks, such as where tasks may have been combined or redundant tasks removed, among other such options. An optimization analyzer in this example might determine all possible optimizations, but then only consider or provide as output a subset of those optimizations, such as those that have at least a minimum probability of significant improvement in the rendering, or those that do not have substantially the same impact as other optimizations. For example, there may be many different orderings for performing tasks with the same dependencies, which would result in the same potential improvement, so in order to reduce complexity and timing only one of these equivalent optimizations might be considered in at least one embodiment. For operations with a large number of tasks to be performed, the number of potential perturbations may explode combinatorically, such that it can be beneficial to only consider a subset of options that are both likely to result in a significant improvement and also differ by at least a minimum amount or criterion from other potential optimizations that are to be considered.

In this example, the optimization analyzer 120 can determine one or more potential optimizations, and can provide information for these optimizations to an RDG reordering module 122, which can generate a new, updated, or optimized RDG for the image to be rendered that includes at least one of the identified optimizations, but also respects the dependencies between tasks associated with nodes of the graph. In some embodiments the optimization analyzer and/or RDG reordering module may be algorithm-based. In some embodiments, the RDG reordering module 122 may generate multiple new RDGs that can each be tested, or can attempt to generate a single RDG that is determined to be optimal from among the set of potential optimizations. The "optimal" graph may be determined based on several criteria, individually or in combination, such as by using a weighted combination of improvement values for each optimization. For example, one approach would be to attempt to determine a new RDG that results in the shortest overall rendering time, taking into account not only ordering of tasks but also resource switching and other such factors. Other criteria might be used, such as where resource switching or usage reduction is prioritized over total rendering time, etc. Once a new (or optimized) RDG is generated, a frame reconstruction module 124 of the FI 116 can submit the sequence of API calls according to the new RDG, or can work with the content application 102 to cause a new sequence of API calls to be issued according to the new RDG, among other such options. The renderer 104 executing on the GPU 108 (or a set of GPUs, etc.) can then perform the tasks in the new sequence according to the second RDG, and can generate a second or "optimized" 128 image, which in at least one embodiment should contain substantially identical image content to the initial image 126 but was "optimized" in its generation, in that it should have taken less time to render or required reduced resource capacity, among other such factors or considerations.

The example system 100 of FIG. 1 also provides for testing of the new reordered RDG. In this example, the initial image 126 and the "optimized" image 128 can be fed to a comparator 130 of the FI 116. The comparator can perform at least two tasks. A first task is to ensure that the initial image and the optimized image contain the same or equivalent image content, such as where the pixel values for corresponding pixel locations in the two images are the same. In some embodiments there may be some allowance for an acceptable amount of deviation of at least certain values. A second task, which can be performed before, after, or in parallel with the first task, is to determine whether the reordered RDG resulted in at least a minimum or threshold level of improvement, whether in rendering time, resource usage, or another such metric. For example, if the optimization does not result in at least a minimum improvement in rendering time then it may not be worth the effort of providing an optimization recommendation to a developer and having the developer implement the optimization. In some embodiments, an optimization recommendation 134 might only be generated and provided by a recommendation generator 132 if the improvement at least meets a minimum threshold or satisfies a specific improvement criterion. An optimization recommendation 134 can include not only information about the specific optimization, such as a copy of (or link to) the new RDG, etc., but can also include information about the determined improvement in rendering time or performance so that a developer or other such entity can determine whether to implement the optimization. The recommendation can also indicate that it was verified that the optimization did not impact the produced image or frame as well, or provide some type of quality metric that can be used to make the determination as to whether to implement the optimization. In at least some embodiments, the optimizations can be tested at runtime instead of requiring a separate, offline testing process.

In at least one embodiment, the detection or determination of potential optimizations, as well as the automatic live testing of at least some of these optimizations, can be fully automated. An FI application 116, or other such optimization and/or testing module, system, component, or process, can operate on the finest possible granularity for analyzing a resource dependency graph, whereas existing game engine scheduling systems operate at a higher level. This ability allows an FI to be able to accurately detect potential optimizations. The finest level in at least one embodiment is the unique state of the resources that are written to at least once for a frame during the execution of a draw, dispatch, or other such command. In contrast, the higher level can be at the algorithmic or render pass level, such as for screen space ambient occlusion (SSAO), cascaded shadows, or particle simulation, among other such options. In one or more embodiments, an FI can also incorporate knowledge of a given GPU architecture and driver implementation details in order to make even more precise analysis. For example, FI is able to detect and minimize many unnecessary GPU idling operations.

Figure 2A:
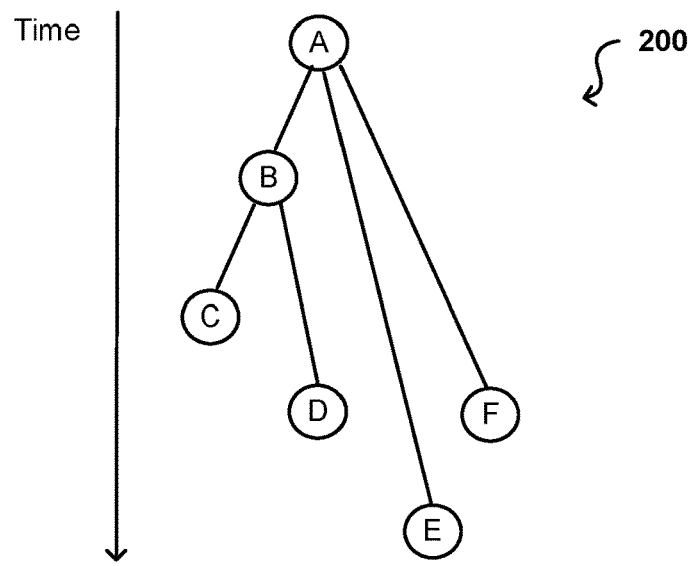
FIGS. 2A, 2B, and 2C illustrates example resource dependency graphs, according to at least one embodiment.
Figure 2B:
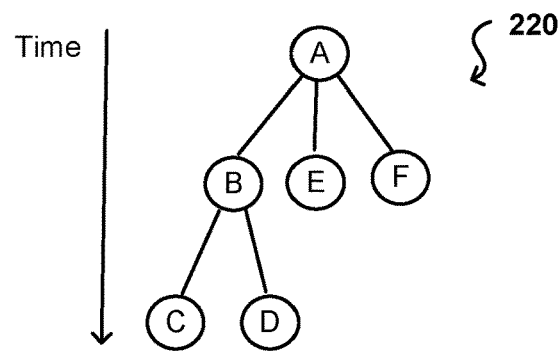
Figure 2C:
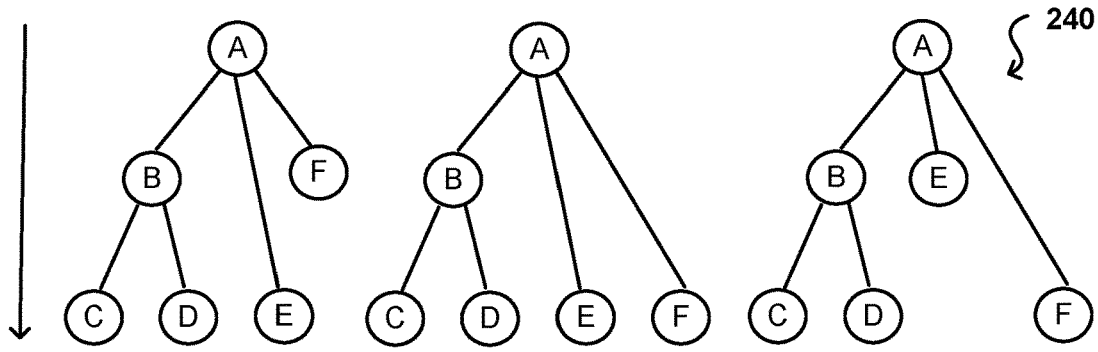

FIGS. 2A-2C illustrate example RDGs that may be produced for a set of tasks in at least one embodiment. It should be understood that these are relatively simple graphs for ease of explanation, but that actual RDGs may include hundreds or thousands of nodes, with many corresponding dependencies. Each node in a given RDG 200, such as is illustrated in FIG. 1A, can correspond to an API call or potentially thousands of API calls. The RDG 200 in FIG. 2A might be a first RDG generated in response to intercepting a stream of API calls, where the edges represent dependencies between calls or tasks. As illustrated, there is an initial task A, from which tasks B, E, and F are directly dependent. Tasks C and D in turn are dependent also on task B. As illustrated the sequence of tasks was observed to be executed (or called to be executed) in descending order from top to bottom, with the overall time for execution represented by the timeline on the left (which could have any appropriate units, such as seconds or milliseconds). In this example RDG 200, it can be seen that task E was called and executed last, even though it had a dependency only on initial task A. Further, tasks C and D were executed at different times even though they both depend directly from task B. An optimization detection module can take in such an RDG 200 and detect these and other potential places for optimization.

For example, an optimized RDG 220 might be produced such as that illustrated in FIG. 2B. In this example, there have been various changes to the ordering of the task sequence, as well as to cause certain tasks to be executed in parallel. For example, since tasks B, E, and F all have dependencies from task A, those tasks can be adjusted in the RDG to be able to execute in parallel (assuming available resources and other factors that allow for such execution). Similarly, tasks C and D can be adjusted to execute in parallel since they both have dependencies from task B. As illustrated, the time to perform such an optimized sequence of tasks can be significantly reduced, as the RDG was collapsed from five levels, with five separate execution time steps, to three levels, with three separate execution steps.

It will often be the case, however, that there will be many other potential optimizations that maintain the same dependencies. For example, the RDGs 240 of FIG. 2C all maintain the same dependencies and collapse the RDG down to three levels. In some embodiments, the overall improvement can be viewed as equivalent to that of FIG. 2B, so only one of these options might be presented for testing, with the other improvements being viewed as redundant. There might be cases, however, where one of the reordered RDGs of FIG. 2C might be selected in addition to, or instead of, the reordered RDG 220 of FIG. 2B, such as where one of these RDGs results in fewer resource switches or other such differences and potential improvements. There may be various other optimizations considered as well that may make additional changes, such as to combine some of these tasks, remove redundant or unnecessary tasks, add or modify tasks, etc. For individual potential optimizations, a redundancy check may be performed along with an improvement estimation, and one or more potential optimizations selected for testing based on factors such as probability for improvement or magnitude of a potential improvement, among other such factors.

In some embodiments, optimization and testing functionality as described herein can be implemented as part of an automated test service. This service might take the form of a Web service that is hosted by one or more servers with a large number of processors (e.g., CPUs, GPUs, DPUs, or other parallel processors or hardware accelerators). Such a testing service can perform various other types of optimization testing, as may be appropriate for an online gaming environment or other such application or use case. Such a service might already capture or receive a trace that includes all the data needed to render a single frame of image or video content, and additional recommendations can be provided by analyzing this trace data. In at least one embodiment, all potential recommendations for an instance of content production or an application can be combined and provided in a single report.

At least some of this data can help to produce optimized RDGs for an image or frame as well. For example, the data might provide individual profiling time slices indicating how much GPU capacity is being used, as well as where that capacity is being provided and in what manner. Such an approach can help to determine which time steps or tasks are more memory and/or compute intensive, and which buffers are being used for individual tasks. Such information can help to identify potential optimizations that correspond to asynchronous compute opportunities. These opportunities allow compute workloads to be run simultaneously with graphics workloads in at least some embodiments. An FI can reconstruct a render graph in real time, and because it knows which resources are used for individual tasks, an FI can correctly move regimes around in the frame or perform other automatic adjustments, reorganizations, or other optimizations. An individual frame can be generated using a set of render passes or tasks, and each of these tasks can require certain buffers or resources. For a given frame, there may be hundreds of tasks that run according to a set of dependencies, but there may be many potential orderings that respect these dependencies. In at least one embodiment, this process can be repeated and tested until an optimal ordering is obtained for a set of tasks and related dependencies. In at least one embodiment, optimizations may be determined for a single frame, but then tested on not only that frame but also future or subsequent frames to provide a better sense of the overall improvement that is not limited to generation of a single frame.

In some embodiments, additional information may be used to determine optimizations as well. For example, a resource usage tracker can determine the an amount of time that each node or task takes to execute. It might be the case that overlapping A with B might seem to provide a significant improvement based on the RDG alone, but if A and B are very small and do not take much time to execute then the overhead of making those tasks execute in parallel could be more than would be gained from running them in parallel since there is a cost to synchronizing the different hardware queues on the GPU that have to go through the OS. Thus, there might be a minimum cost or improvement factored in to determine whether there is value in attempting a potential optimization. In some instances, if the optimization is paying the cost for parallelization then it might be advantageous to add more tasks to the parallelization that might not otherwise have warranted reordering. For some API calls there may be multiple valid execution orders, but of which some induce unnecessary GPU idling operations, and in some embodiments the execution order with the fewest such idling operations can be identified. Information needed to make such determinations may not be available from the RDG, but may require contacting a driver or other such source of information.

In some embodiments, the API calls can be ordered in a predictable, deterministic, canonical fashion, which may be independent of efficiency, based on a fix set of rules. There are often many possible and equivalent orderings of API calls, and placing them into such an ordering dramatically reduces the number of potential orderings other optimization analysis routines need to check. Additionally, such orderings allow different traces of the same application to be analyzed and compared more accurately by removing differences between them that arise when such similarities are not enforced. In some instances, a reordering might result in an efficiency improvement but the produced image (or other result) is not as anticipated. This may be indicative of a bug or problem with the process. In at least one embodiment, a report might be generated that then is not necessarily a recommendation, but an indication that a reordering was performed (with information about the reordering) and an error was detected in the output (with information about the error), which can then help a developer to identify an issue with the code to be resolved. For images, a simple comparison can be performed to see if there are any differences in pixel value between the initial and optimized images, and if so then notification can be provided of a detected issue with the image generation process.

Figure 3:
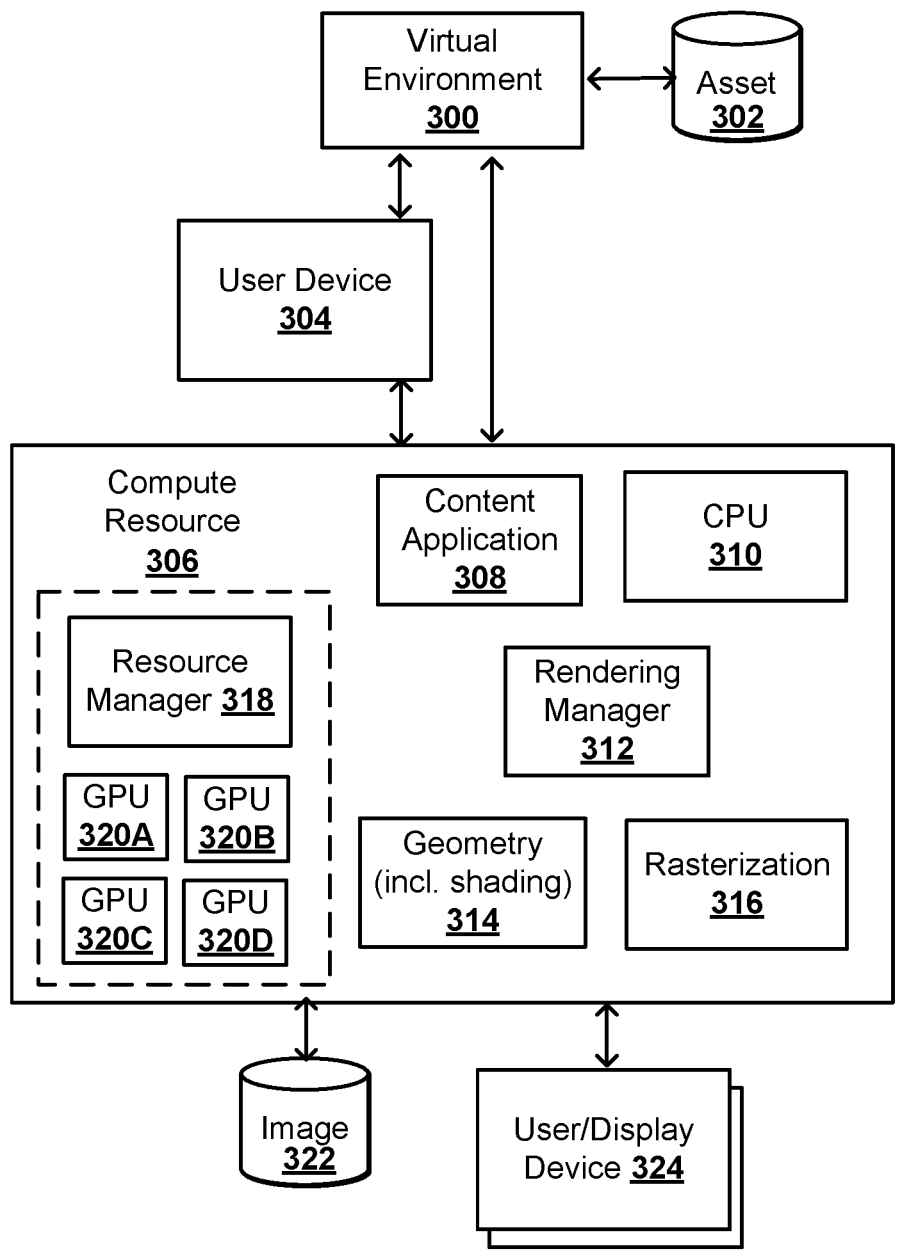
FIG. 3 illustrates an example system for generating content, according to at least one embodiment.

FIG. 3 illustrates an example system for rendering an image, video frame, or other instance of image-related content in accordance with at least one embodiment. Such a system can include or incorporate functionality as presented herein to allow for automatic optimization and testing of task sequences used for rendering or other such operations. In this example, an image is to be rendered for a scene in a virtual environment 300, although images can be rendered for semi-virtual or real environments as well using such a system. The virtual environment 300 may include geometry and other data representative of shapes or objects in the environment, such as three-dimensional (3D) objects that are representative, or are to be included in, a scene that occurs within the environment, as may include foreground objects such as people or vehicles, or background objects such as roads and buildings, among other such options. In at least some embodiments, at least some of the content for the scene may also be obtained from an asset repository 302, or other such location, which can contain content—such as geometry, textures, and density data—that can be used to render the scene. In at least some embodiments or instances, there can be a user device 304 running a content generation or management application that can allow a user to select assets 302 and at least a relevant portion of the virtual environment 300 to use in rendering the scene. The user device 304 can also allow a user to control aspects of the image 322 to be rendered, such as the location or pose of an object in the scene, as well as a viewpoint and other parameters of a virtual camera to be used to render an image 322 of the virtual environment 300 for display by a display device 324.

In this example, at least one compute resource 306 is used to perform the rendering. This resource may correspond to one or more servers, for example, that may be located locally or across at least one network, among other such options. In some embodiments, the rendering may instead be at least partially performed on the user device 304. The compute resource 306 may obtain or receive data to be used for the rendering, as may include geometry, texture, and density data for the virtual environment or assets, as well as information about the locations and poses of those objects in the scene and parameters of a virtual camera to be used to determine the view of the scene to be rendered. This information may be received to a content application 308, for example, that may be executing on a central processing unit (CPU) 310 of the compute resource that is responsible for tasks such as collecting data, causing an image to be rendered, and performing any formatting or encoding of a produced image, among other such operations. The content application can work with a rendering manager 312, for example, which can be responsible for coordinating operations of a rendering pipeline executing on the compute resource 306, as may include modules 314, 316 or processes responsible for tasks such as geometry related tasks (including lighting and shading tasks) and rasterization, among other such tasks. In at least some embodiments, at least some of these rendering tasks may be performed using one or more GPUs 320A-D of the compute resource, as well as potentially one or more processors or compute instances (physical or virtual) of one or more other compute resources.

A task such as ray tracing or volumetric sampling can be performed using a single processor, such as a single GPU, or can have operations distributed across multiple GPUs 320A-D). In this example, there can be a pool or set of GPUs 320A-D, and a resource manager 318 can be at least partially responsible for allocating a GPU to perform the processing for an operation. If it is desired or beneficial to use more than one GPU then the resource manager 318 can allocate one or more GPUs having the appropriate capacity or capabilities. This can include allocating a number of GPUs indicated in a request, or determining a number of GPUs to allocate based in part on the request. In some embodiments, the resource manager may also be able to monitor an available bandwidth or memory in order to determine which and how many GPUs to allocate, such as where having high bandwidth capacity can allow operations to be spread across a greater number of GPUs, where bandwidth impact due to forwarding ray information will not be as critical, while having a bandwidth constrained system may cause the resource manager to attempt to allocate as few GPUs as possible in order to attempt to reduce the number of forwarding messages required.

In at least one embodiment, a partitioning of data can be performed by a rendering manager 312, for example, and the assigning of data to different processors can be performed by a resource manager 318 of the system. The resource manager can receive information from the rendering component, and can select appropriate processors from a pool of available processors 320 or processor capacity. In some embodiments, the rendering application can choose the partitioning, while in other embodiments the renderer may have no control over the data partitioning, which may be done by a separate management component (not illustrated in FIG. 3).

Figure 4:
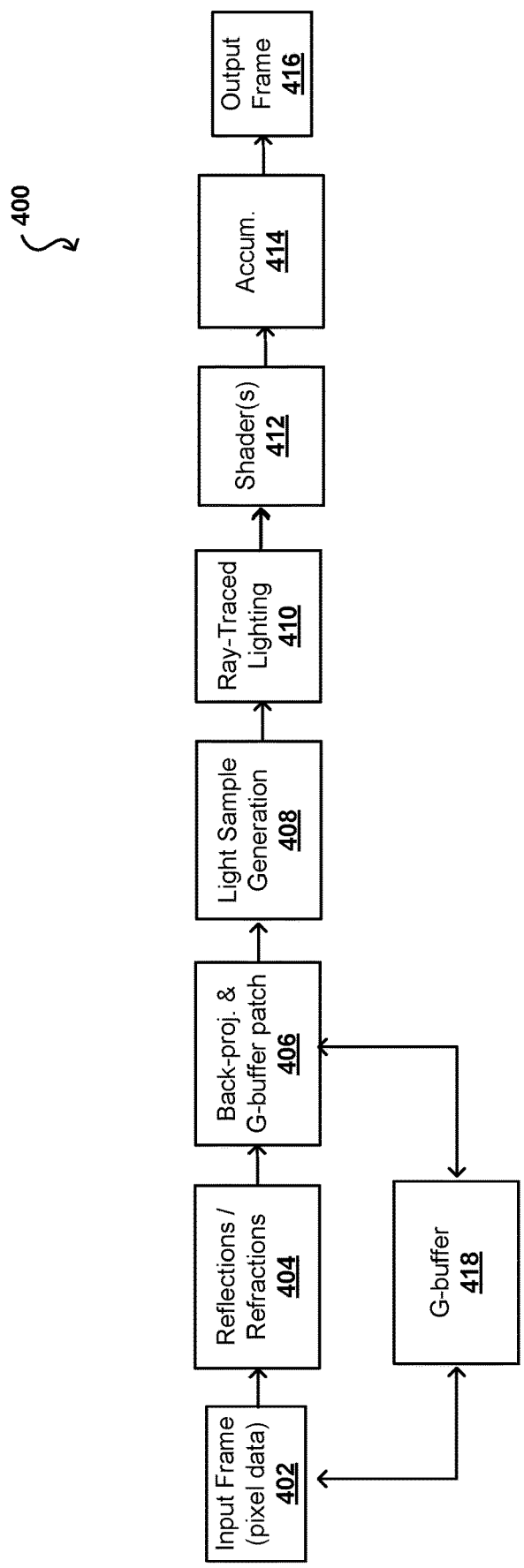
FIG. 4 illustrates an example rendering pipeline, according to at least one embodiment.

FIG. 4 illustrates an example image generation pipeline 400 that can be used in a system—such as that illustrated in FIG. 3—to render one or more images, such as video frames in a sequence. In this example, pixel data 402 for a current frame to be rendered (as may include G-buffer data for primary surfaces) can be received as input to a reflections and refractions component 404 of a rendering system. Reflections and refractions component 404 can use this data to attempt to determine data for any determined reflections and/or refractions in the pixel data, and can provide this data to a back-projection and G-buffer patching component 406, which can perform back-propagation as discussed herein to locate corresponding points for those reflections and refractions, and use this data to patch the G-buffer 418, which can provide updated input for a subsequent frame to be rendered. The data can then be provided to a light sample generation component 408 to perform light sampling, a ray-traced lighting component 410 to perform ray-traced lighting, and one or more shaders 412, which can set the pixel colors for the various pixels of the frame based at least in part upon the determined lighting information (along with other information such as color, texture, and so on). The results can be accumulated by an accumulation module 414 or component for generating an output frame 416 of a desired size, resolution, or format.

In at least one embodiment, a generation component 408 can perform the backward projection step. Once a backward projection pass has finished, and gradient surface parameters have been patched into the current G-buffer, a renderer can execute the lighting passes. Using information from the lighting passes and the lighting results from the previous frame, gradients can be computed then filtered and used for history rejection. Such an approach can be used to compute robust temporal gradients between current and previous frames in a temporal denoiser for ray traced renderers. Such a backward projection-based approach can also work through reflections and refractions, and can work with rasterized G-buffers. Previous approaches for backward projection omitted any G-buffer patching and relied on the raw current G-buffer samples instead, which also results in false positive gradients. Patching the surface parameters can eliminate false positives in the vast majority of cases, making the denoised image very stable yet still quickly reacting to lighting changes. Once the backward projection pass is finished, and gradient surface parameters have been patched into the current G-buffer, a renderer can execute the lighting passes. Using the information from the lighting passes and the lighting results from the previous frame, the gradients are computed then filtered and used for history rejection. As mentioned, the ordering of at least some of these tasks can be optimized to improve efficiency or resource utilization, for example, where potential optimizations can be determined and tested automatically, with recommendations then either being provided to developers or in some instances automatically applied for future operations, in accordance with at least one embodiment.

Figure 5:
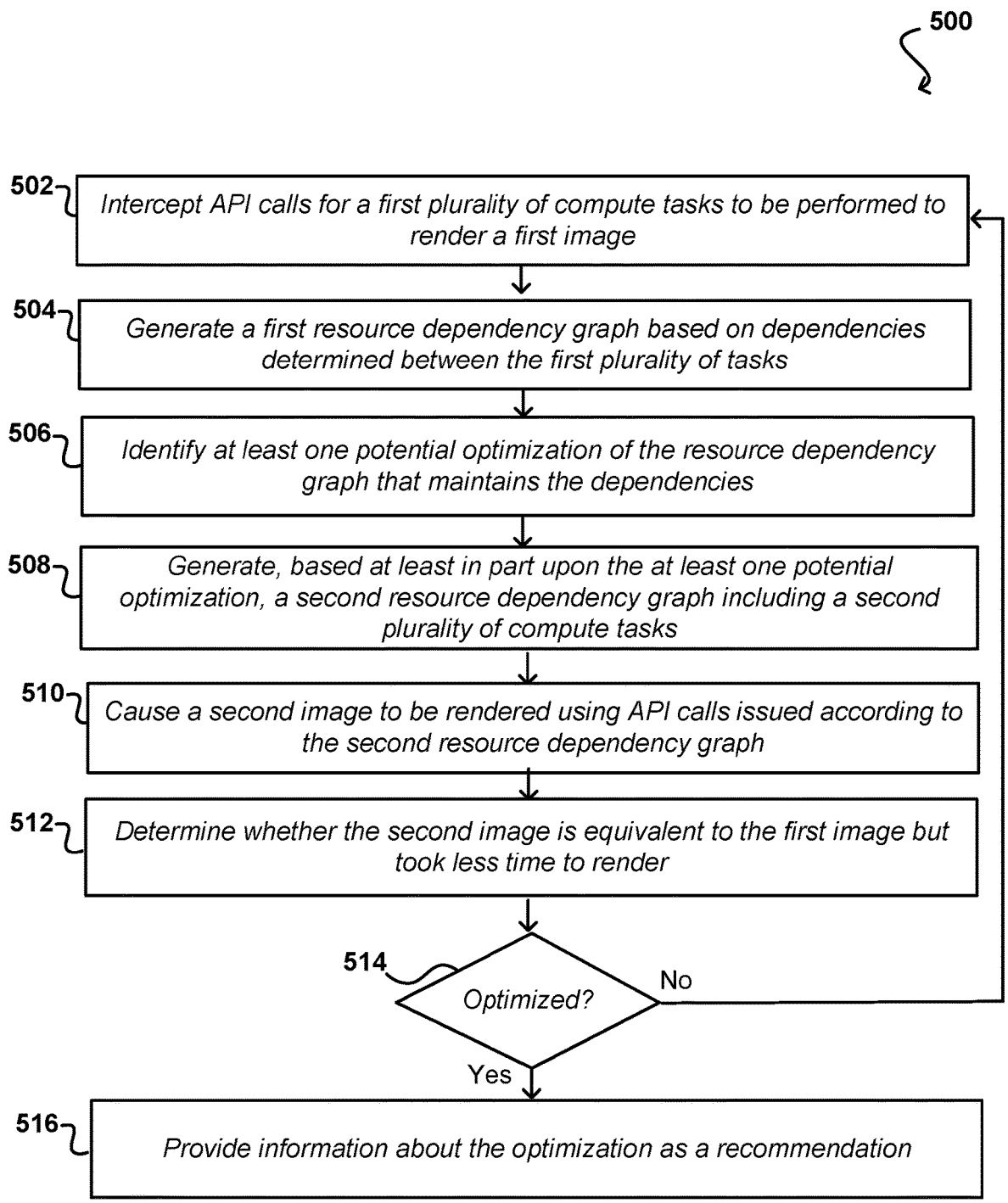
FIG. 5 illustrates an example process for optimizing and testing tasks used for image generation, according to at least one embodiment.

FIG. 5 illustrates an example process 500 to automatically optimize and test a sequence of compute tasks that can be performed in accordance with at least one embodiment. It should be understood that for this and other processes presented herein that there may be additional, fewer, or alternative steps performed or similar or alternative orders, or at least partially in parallel, within the scope of the various embodiments unless otherwise specifically stated. Further, although this example will be discussed with respect to images, there can be other types of results produced by a plurality of compute tasks for which optimization may be beneficial as well within the scope of various embodiments. In this example, a sequence of API calls can be intercepted 502, where those calls correspond to a first plurality of compute tasks to be performed to render a first image. Information from these intercepted calls, can be used to generate 504 a first resource dependency graph (RDG) based on dependencies determined between the first plurality of tasks. The RDG can be analyzed, as may include additional information as to resource usage and performance for individual tasks, and at least one potential optimization of the RDG can be identified 506 that may improve performance or efficiency but respects the dependencies between tasks. A second resource dependency graph (or updated RDG) can be generated 508 based at least in part on the potential optimization(s), where the second RDG includes a second plurality of compute tasks, which may be the same as, or different from, the first plurality of compute tasks. A second image can then be caused 510 to be rendered using API calls issued according to the second resource dependency graph. A determination can be made 512 as to whether the second image is equivalent to the first image, but took less time (or was more efficient) to render. If the process was optimized 514, such as where an equivalent image was generated more efficiently, then information about the optimization can be provided 516 as a recommendation. In at least some embodiments, additional testing might be performed for one or more additional or subsequent images or frames. If the images were not sufficiently equivalent or there was not an improvement that at least satisfied a minimum improvement threshold or criterion, then the process can continue to attempt to find a different optimization, at least until an optimization end criterion is satisfied, such as a maximum number of attempts being reached or probability of improvement falling below a determined threshold, among other such options.

Aspects of various approaches presented herein can be lightweight enough to execute in various locations, such as on a device such as a client device that include a personal computer or gaming console, in real time. Such processing can be performed on, or for, content that is generated on, or received by, that client device or received from an external source, such as streaming data or other content received over at least one network from a cloud server 620 or third party service 660, among other such options. In some instances, at least a portion of the processing, generation, optimization, testing, and/or determination of this content may be performed by one of these other devices, systems, or entities, then provided to the client device (or another such recipient) for presentation or another such use.

Figure 6:
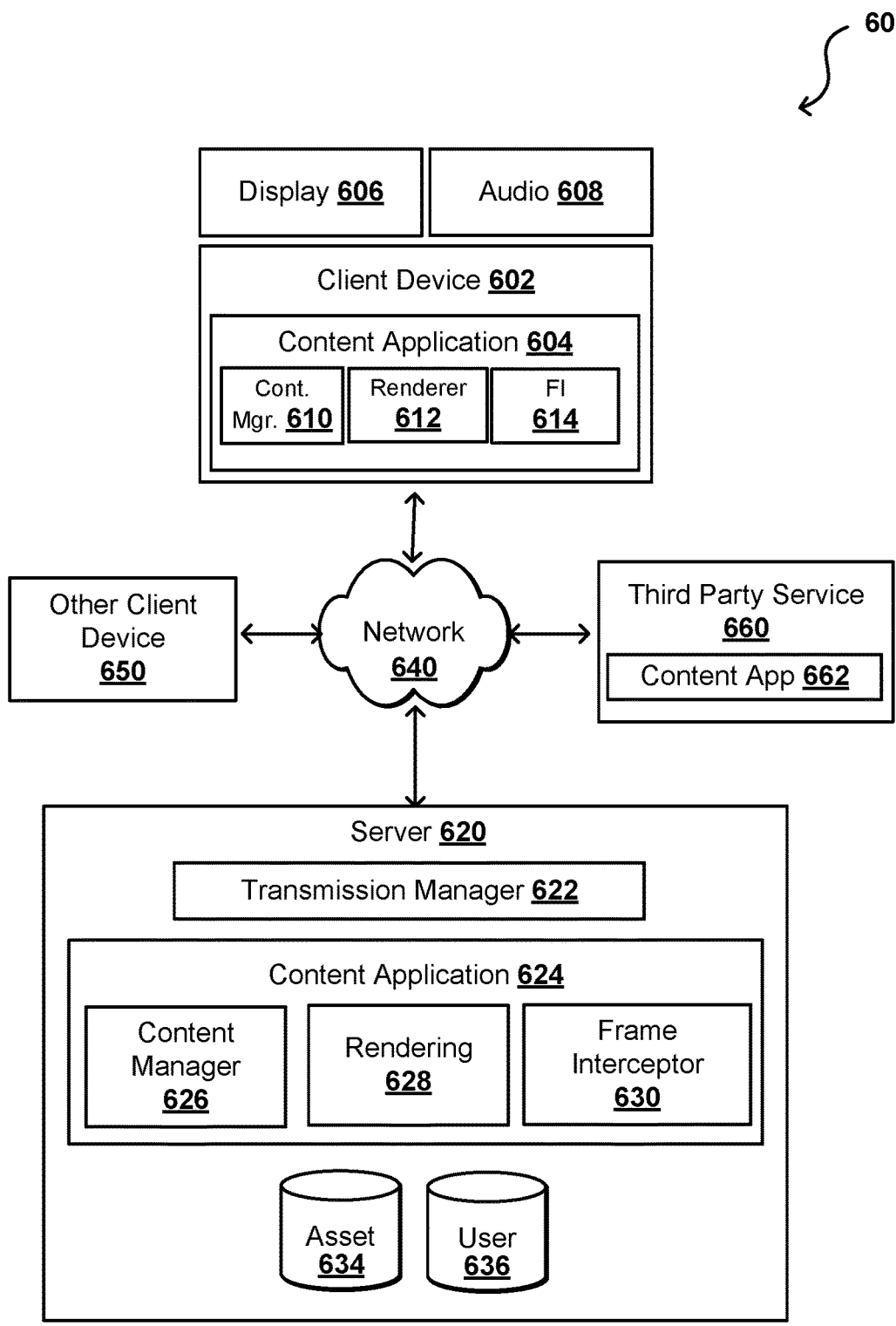
FIG. 6 illustrates components of a distributed system that can be used to optimize and test a set of task optimizations, according to at least one embodiment.

As an example, FIG. 6 illustrates an example networked system configuration 600 that can be used to provide, generate, modify, encode, process, and/or transmit image data or other such content. In at least one embodiment, a client device 602 can generate or receive data for a session using components of a content application 604 on client device 602 and data stored locally on that client device 602. In at least one embodiment, a content application 624 executing on a server 620 (e.g., a cloud server or edge server) may initiate a session associated with at least one client device 602, as may use a session manager and user data stored in a user database 636, and can cause content such as one or more digital assets (e.g., implicit and/or explicit object representations) from an asset repository 634 to be determined by a content manager 626. A content manager 626 may work with a rendering module 628 to generate image, video, or other such content. Such content can be rendered by the rendering module 628 and provided for presentation via the client device 602. In at least one embodiment, this rendering module 628 can work with (or contain) a frame interceptor 630 that can perform automated optimization and testing for rendering operations. At least a portion of the content, once rendered, may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding content application 604, which may also or alternatively include a graphical user interface, content manager 610, rendering module 612, and/or Frame Interceptor 614 for use in providing, synthesizing, rendering, compositing, modifying, or using content for presentation (or other purposes) on or by the client device 602. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
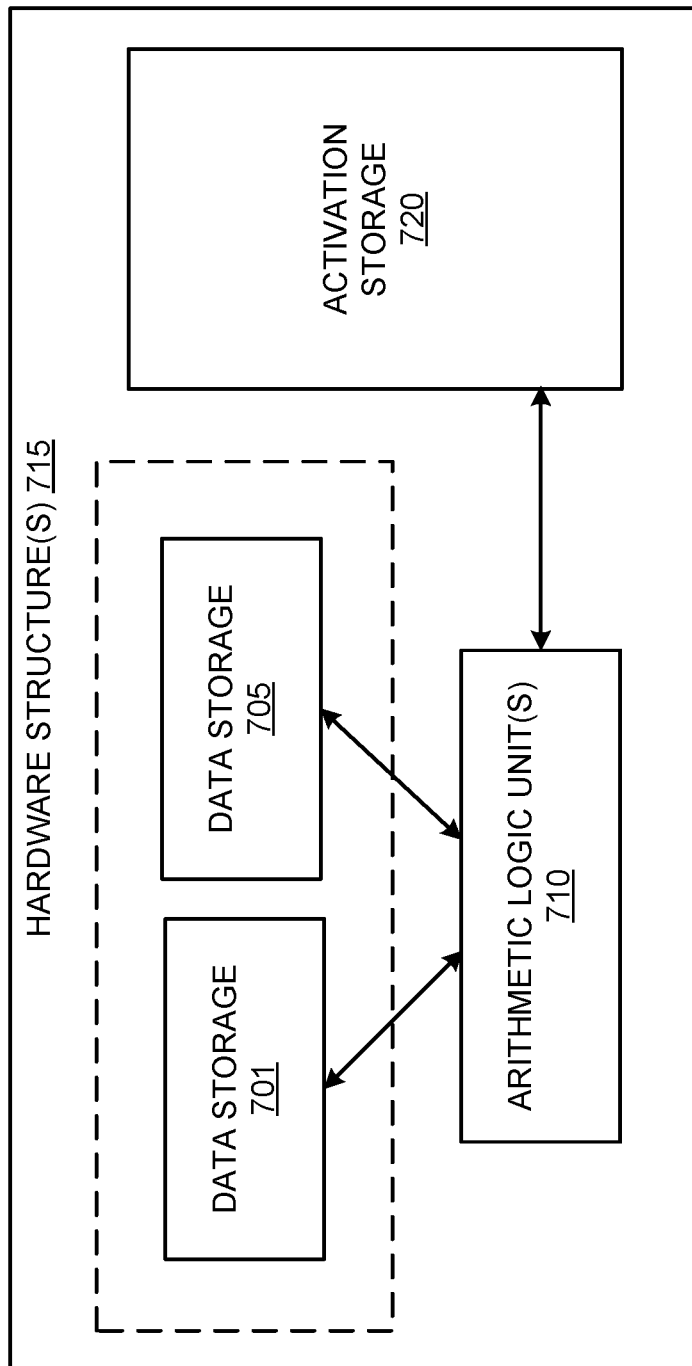
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 701 and/or code and/or data storage 705 are used as operands along with other values, such as bias values, gradient information, momentum values, or other parameters or hyperparameters, any or all of which may be stored in code and/or data storage 701 or code and/or data storage 705 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
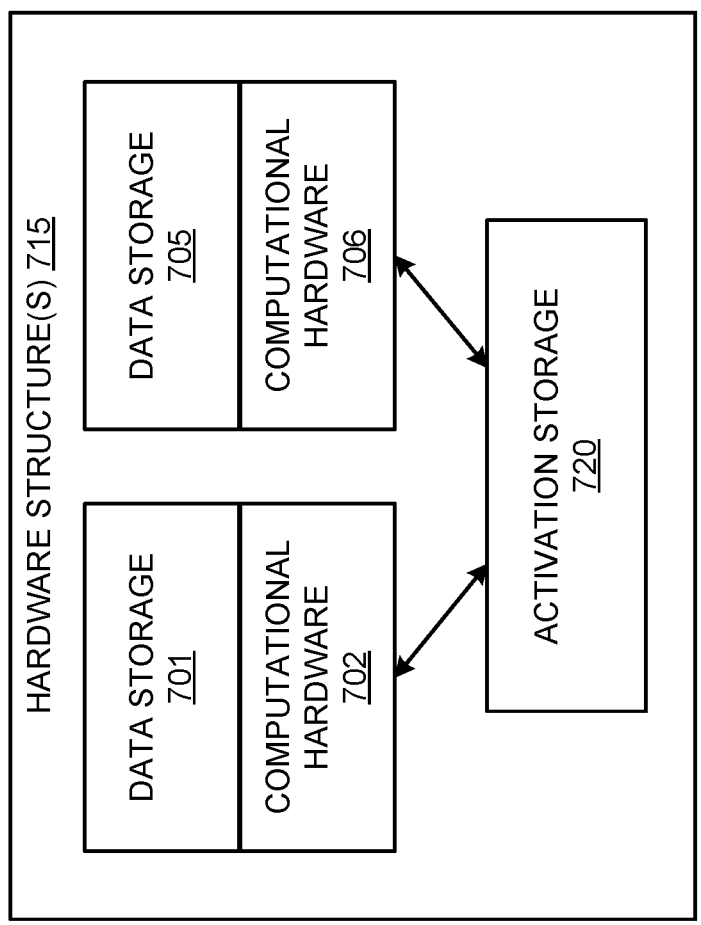
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
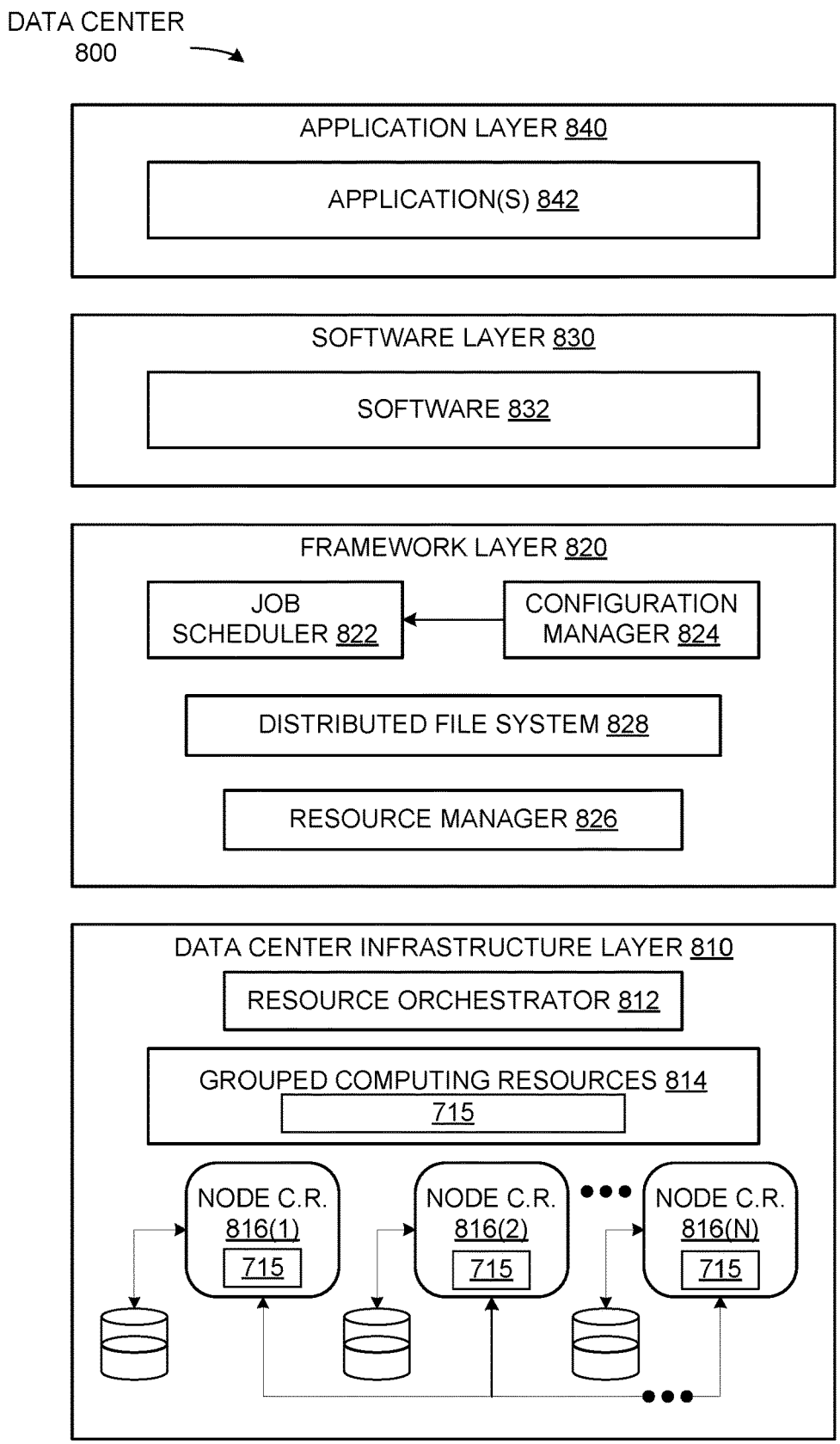
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to automatically optimize and test reordering of tasks with dependencies maintained in a resource dependency graph.

Computer Systems

Figure 9:
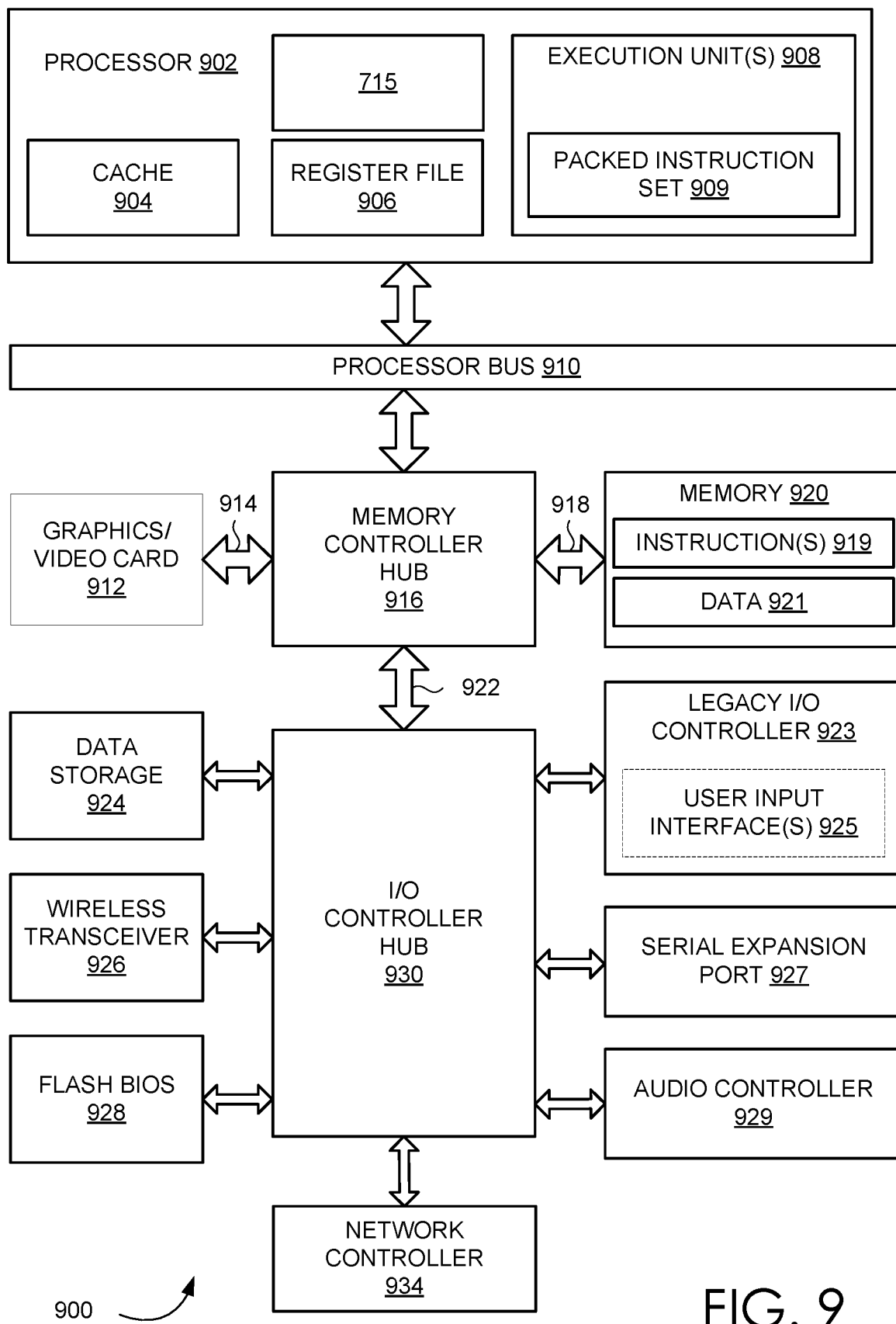
FIG. 9 illustrates a computer system, according to at least one embodiment.

FIG. 9 is a block diagram illustrating an exemplary computer system 900, which may be a system with interconnected devices and components, a system-on-a-chip (SOC) or some combination thereof formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution unit(s) 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word computing ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache 904 may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit(s) 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit(s) 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor data bus 910 for performing operations on packed data, which may eliminate need to transfer smaller units of data across processor data bus 910 to perform one or more operations one data element at a time.

In at least one embodiment, execution unit(s) 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interface(s) 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to automatically optimize and test reordering of tasks with dependencies maintained in a resource dependency graph.

Figure 10:
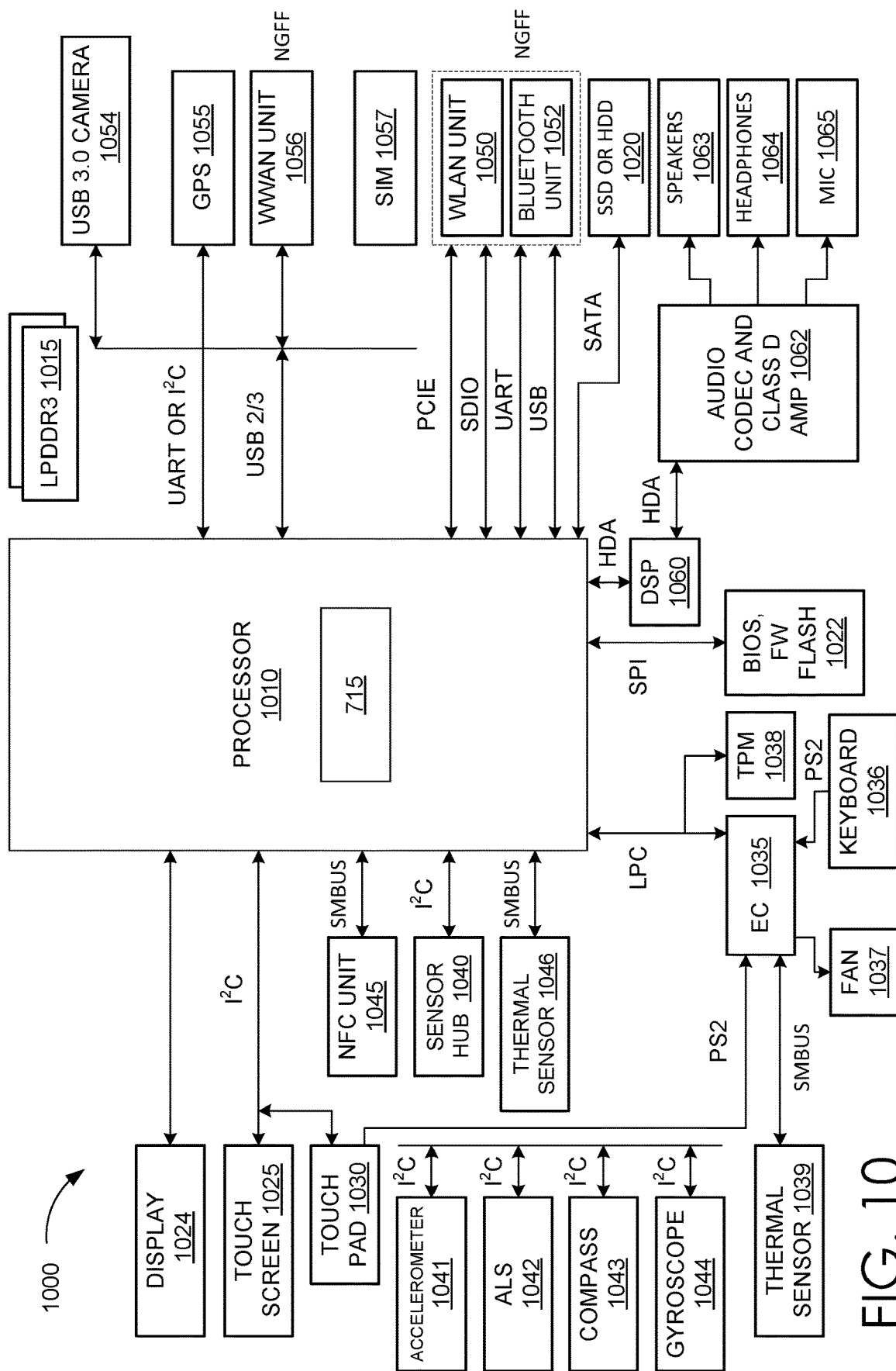
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates an electronic device 100, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1043, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to automatically optimize and test reordering of tasks with dependencies maintained in a resource dependency graph.

Figure 11:
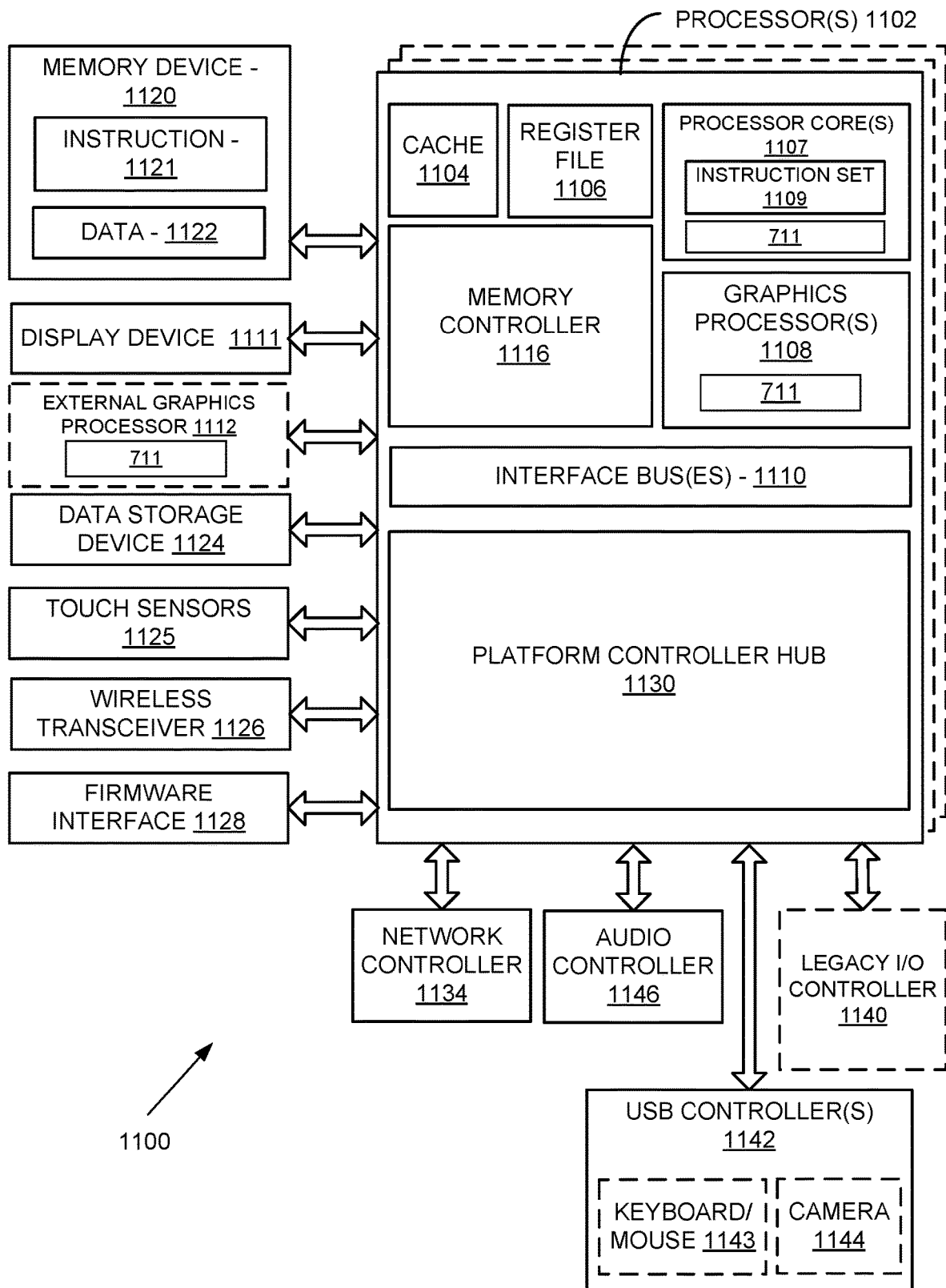
FIG. 11 illustrates at least portions of a graphics processor, according to one or more embodiments.

FIG. 11 is a block diagram of a processing system, according to at least one embodiment. In at least one embodiment, processing system 1100 includes one or more processor(s) 1102 and one or more graphics processor(s) 1108, and may be a single processor desktop system, a multiprocessor workstation system, or a server system having a large number of processor(s) 1102 or processor core(s) 1107. In at least one embodiment, processing system 1100 is a processing platform incorporated within a system-on-a-chip (SoC) integrated circuit for use in mobile, handheld, or embedded devices.

In at least one embodiment, processing system 1100 can include, or be incorporated within a server-based gaming platform, a game console, including a game and media console, a mobile gaming console, a handheld game console, or an online game console. In at least one embodiment, processing system 1100 is a mobile phone, smart phone, tablet computing device or mobile Internet device. In at least one embodiment, processing system 1100 can also include, coupled with, or be integrated within a wearable device, such as a smart watch wearable device, smart eyewear device, augmented reality device, or virtual reality device. In at least one embodiment, processing system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor core(s) 1107 may each process a different instruction set 1109, which may include instructions to facilitate emulation of other instruction sets. In at least one embodiment, processor core(s) 1107 may also include other processing devices, such a Digital Signal Processor (DSP).

In at least one embodiment, processor(s) 1102 includes cache memory ("cache") 1104. In at least one embodiment, processor(s) 1102 can have a single internal cache or multiple levels of internal cache. In at least one embodiment, cache 1104 is shared among various components of processor(s) 1102. In at least one embodiment, processor(s) 1102 also uses an external cache (e.g., a Level-3 (L3) cache or Last Level Cache (LLC)) (not shown), which may be shared among processor core(s) 1107 using known cache coherency techniques. In at least one embodiment, register file 1106 is additionally included in processor(s) 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in processing system 1100. In at least one embodiment, interface bus(es) 1110, in one embodiment, can be a processor bus, such as a version of a Direct Media Interface (DMI) bus. In at least one embodiment, interface bus(es) 1110 is not limited to a DMI bus, and may include one or more Peripheral Component Interconnect buses (e.g., PCI, PCI Express), memory buses, or other types of interface busses. In at least one embodiment processor(s) 1102 include an integrated memory controller 1116 and a platform controller hub 1130. In at least one embodiment, memory controller 1116 facilitates communication between a memory device 1120 and other components of processing system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system processing 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 allows peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 allows communication with system firmware, and can be, for example, a unified extensible firmware interface (UEFI). In at least one embodiment, network controller 1134 can allow a network connection to a wired network. In at least one embodiment, a high-performance network controller (not shown) couples with interface bus(es) 1110. In at least one embodiment, audio controller 1146 is a multi-channel high definition audio controller. In at least one embodiment, system processing 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controller(s) 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, processing system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processing system 1100. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to automatically optimize and test reordering of tasks with dependencies maintained in a resource dependency graph.

Figure 12:
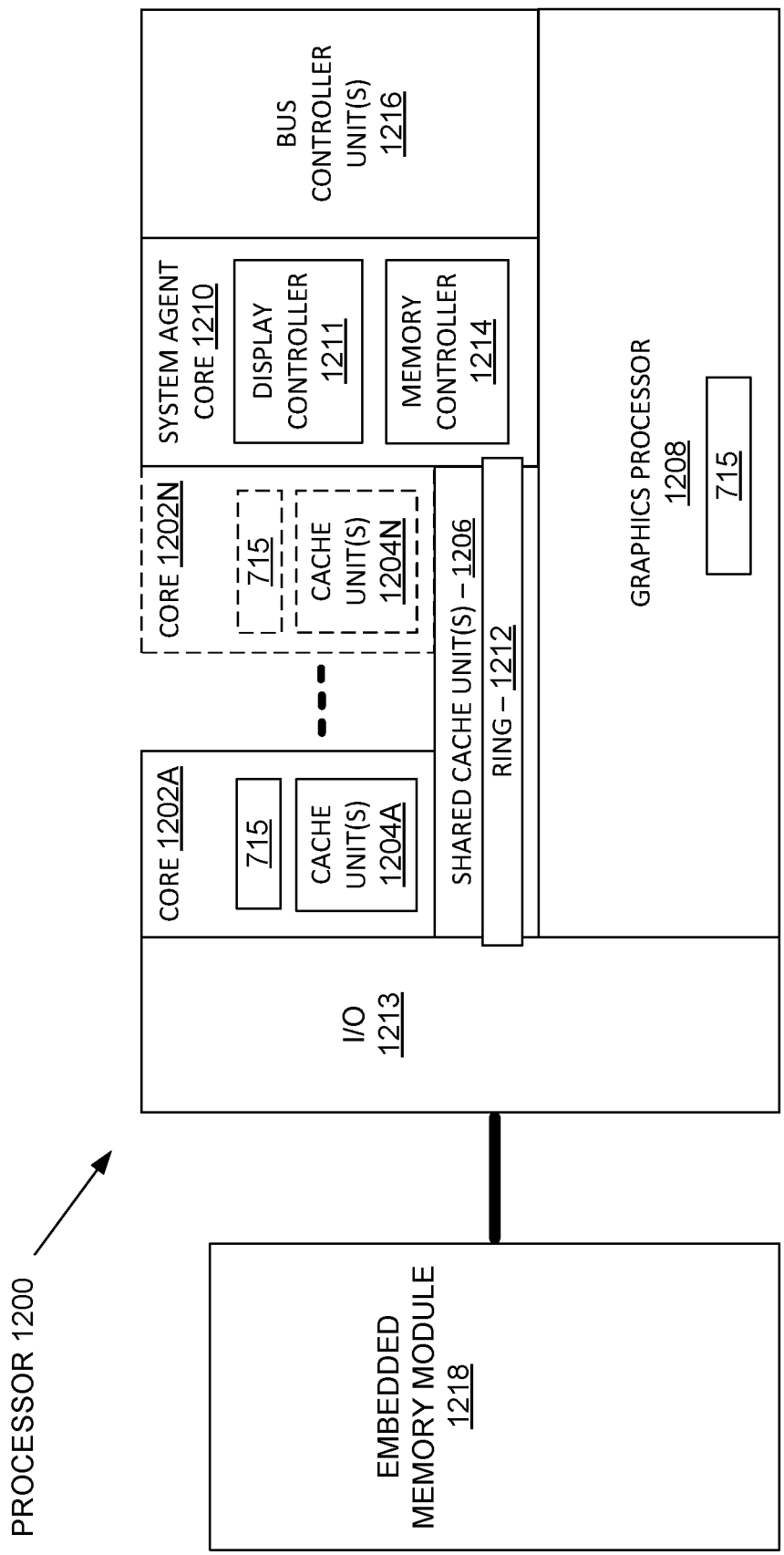
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core(s) 1202N represented by dashed lined boxes. In at least one embodiment, each of processor core(s) 1202A-1202N includes one or more internal cache unit(s) 1204A-1204N. In at least one embodiment, each processor core also has access to one or more shared cached unit(s) 1206.

In at least one embodiment, internal cache unit(s) 1204A-1204N and shared cache unit(s) 1206 represent a cache memory hierarchy within processor 1200. In at least one embodiment, cache memory unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller unit(s) 1216 and a system agent core 1210. In at least one embodiment, one or more bus controller unit(s) 1216 manage a set of peripheral buses, such as one or more PCI or PCI express buses. In at least one embodiment, system agent core 1210 provides management functionality for various processor components. In at least one embodiment, system agent core 1210 includes one or more integrated memory controller(s) 1214 to manage access to various external memory devices (not shown).

In at least one embodiment, one or more of processor core(s) 1202A-1202N include support for simultaneous multi-threading. In at least one embodiment, system agent core 1210 includes components for coordinating and processor core(s) 1202A-1202N during multi-threaded processing. In at least one embodiment, system agent core 1210 may additionally include a power control unit (PCU), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache unit(s) 1206, and system agent core 1210, including one or more integrated memory controller(s) 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory module 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture (ISA), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as a SoC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALUs embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to automatically optimize and test reordering of tasks with dependencies maintained in a resource dependency graph.

Virtualized Computing Platform

Figure 13:
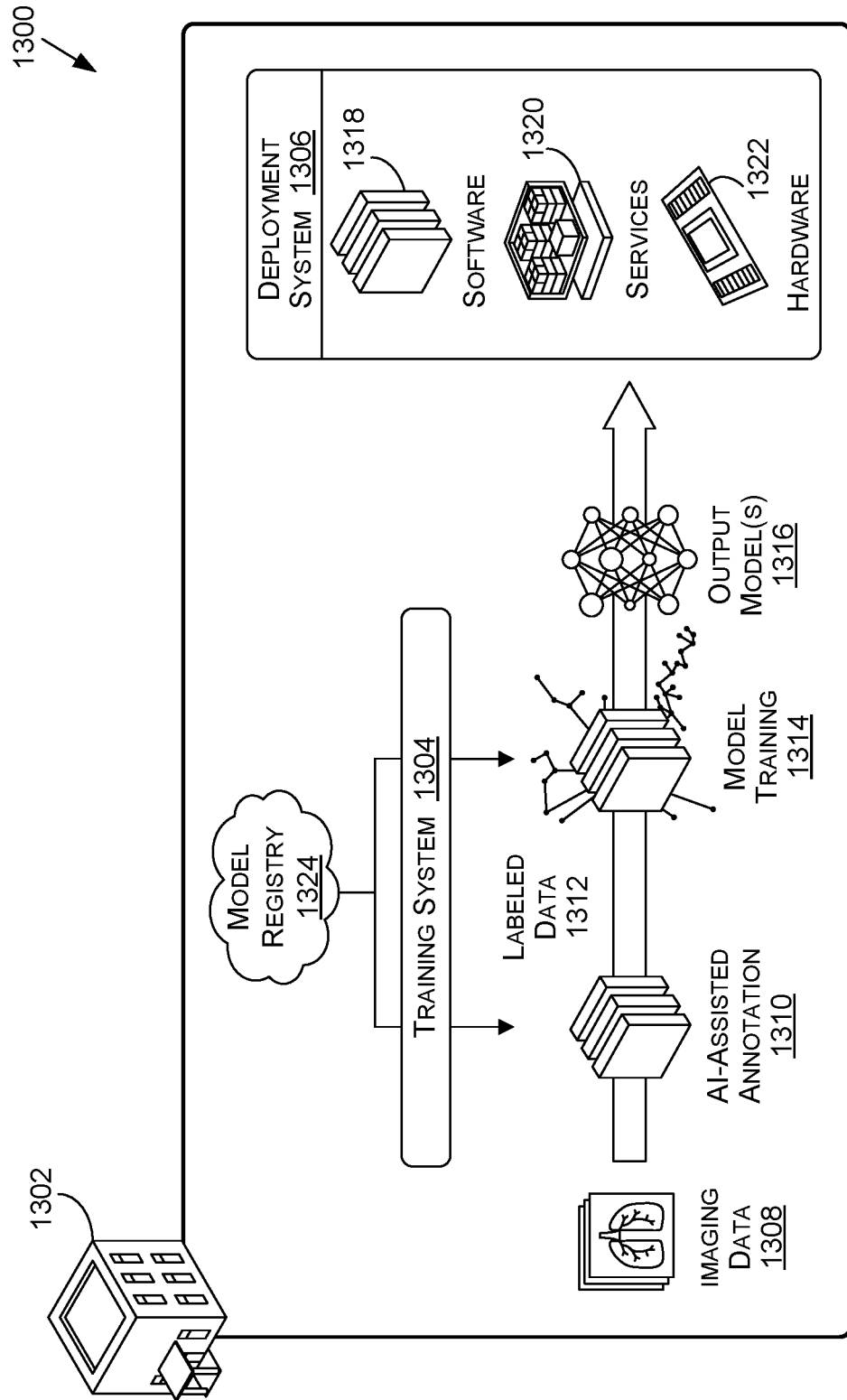
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facility(ies) 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility(ies) 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility(ies) 1302 using data 1308 (such as imaging data) generated at facility(ies) 1302 (and stored on one or more picture archiving and communication system (PACS) servers at facility(ies) 1302), may be trained using imaging or sequencing data 1308 from another facility(ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training system 1304 may include a scenario where facility(ies) 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data 1312, or a combination thereof may be used as ground truth data for training a machine learning model. In at least one embodiment, a trained machine learning model may be referred to as output model(s) 1316, and may be used by deployment system 1306, as described herein.

In at least one embodiment, training system 1304 may include a scenario where facility(ies) 1302 needs a machine learning model for use in performing one or more processing tasks for one or more applications in deployment system 1306, but facility(ies) 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility(ies) 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, a scenario may include facility(ies) 1302 requiring a machine learning model for use in performing one or more processing tasks for one or more applications in deployment system 1306, but facility(ies) 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility(ies) 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotation 1310, labeled data 1312, or a combination thereof—may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., processor 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by process 1300 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., process 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform). In at least one embodiment, rather than each application that shares a same functionality offered by services 1320 being required to have a respective instance of services 1320, services 1320 may be shared between and among various applications. In at least one embodiment, services 1320 may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility(ies) 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to allow seamless scaling and load balancing.

Figure 14:
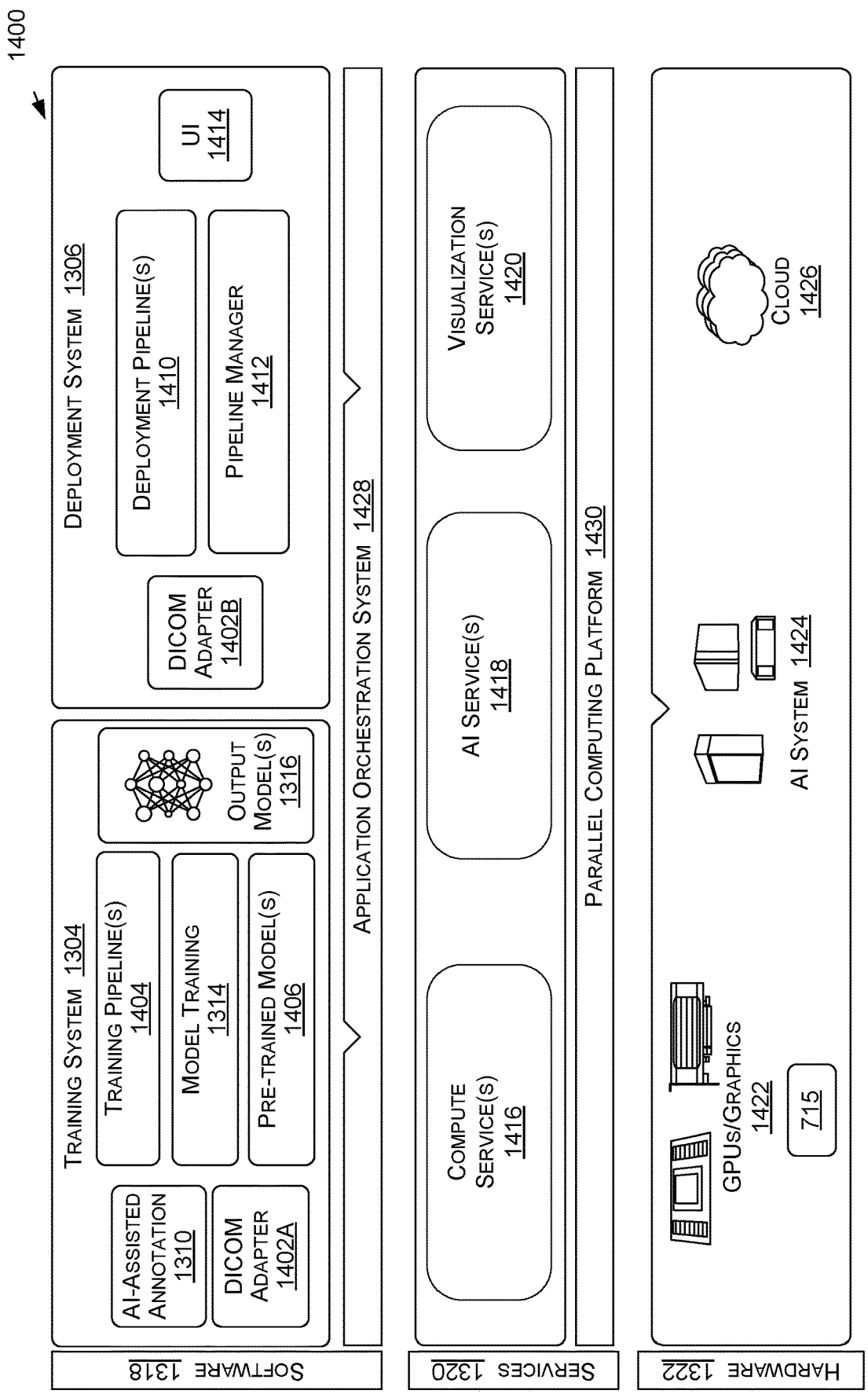
FIG. 14 is a system diagram for an example system for training, adapting, instantiating and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipeline(s) 1404, similar to those described herein with respect to FIG. 13. In at least one embodiment, where one or more machine learning models are to be used in deployment pipeline(s) 1410 by deployment system 1306, training pipeline(s) 1404 may be used to train or retrain one or more (e.g. pre-trained) models, and/or implement one or more of pre-trained model(s) 1406 (e.g., without a need for retraining or updating). In at least one embodiment, as a result of training pipeline(s) 1404, output model(s) 1316 may be generated. In at least one embodiment, training pipeline(s) 1404 may include any number of processing steps, such as but not limited to imaging data (or other input data) conversion or adaption In at least one embodiment, for different machine learning models used by deployment system 1306, different training pipeline(s) 1404 may be used. In at least one embodiment, training pipeline(s) 1404 similar to a first example described with respect to FIG. 13 may be used for a first machine learning model, training pipeline(s) 1404 similar to a second example described with respect to FIG. 13 may be used for a second machine learning model, and training pipeline(s) 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipeline(s) s 1404 may include AI-assisted annotation, as described in more detail herein with respect to at least FIG. 14. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation 1310 may be performed as part of deployment pipelines 1410; either in addition to, or in lieu of AI-assisted annotation 1310 included in training pipeline(s) 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility(ies) 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline(s) 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline(s) 1410 depending on information desired from data generated by a device. In at least one embodiment, where detections of anomalies are desired from an MRI machine, there may be a first deployment pipeline(s) 1410, and where image enhancement is desired from output of an MRI machine, there may be a second deployment pipeline(s) 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface ("UI") 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, UI 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (e.g., execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may allow general purpose computing on GPUs (GPGPU) (e.g., GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (e.g., tasked with performing one or more processing tasks of an application). In at least one embodiment, AI service(s) 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs 1422/Graphics may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization service(s) 1420 may include an internal visualizer, cinematics, and/or other rendering or image processing capabilities or functionality (e.g., ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (e.g., NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs/Graphics 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs/Graphics 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to allow seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
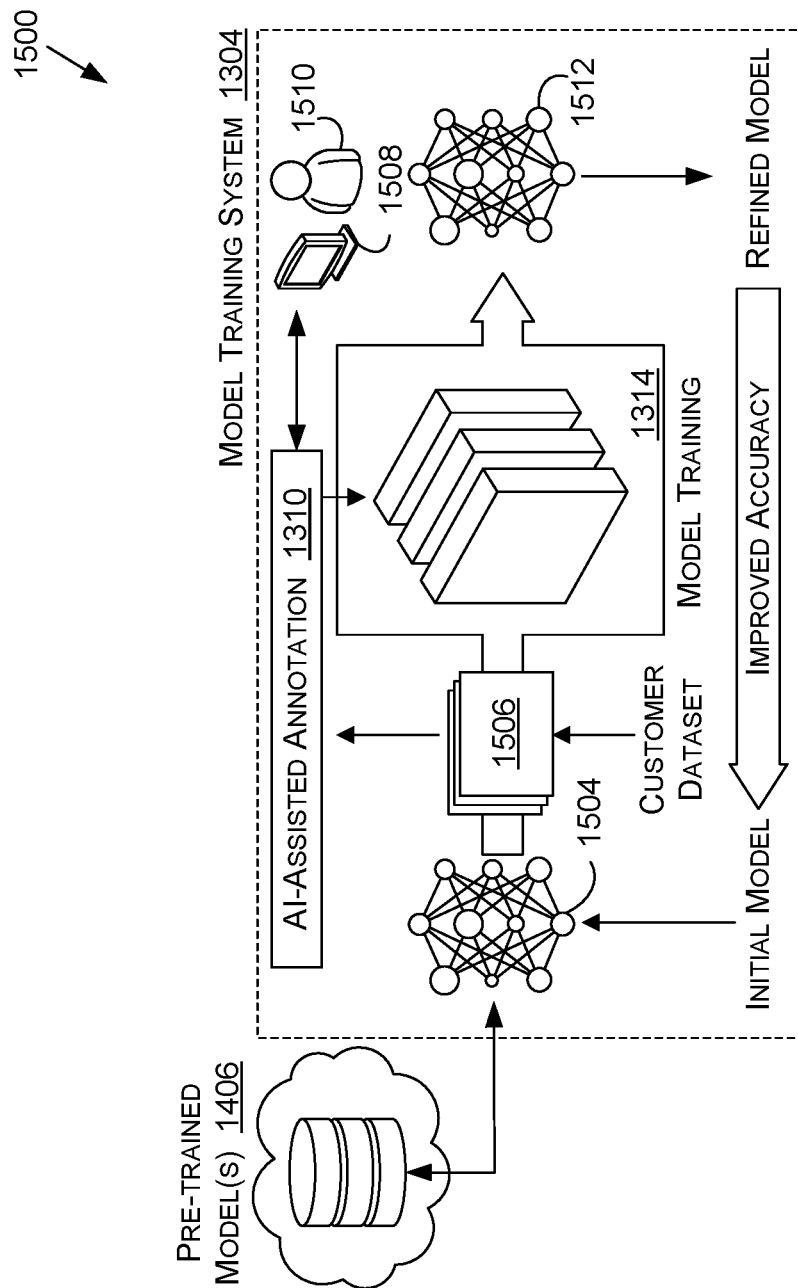
FIGS. 15A and 15B illustrate a data flow diagram for a process to train a machine learning model, as well as client-server architecture to enhance annotation tools with pre-trained annotation models, in accordance with at least one embodiment.

FIG. 15A illustrates a data flow diagram for a process to train, retrain, or update a machine learning model, in accordance with at least one embodiment. In at least one embodiment, a process may be executed using, as a non-limiting example, system 1500 of FIG. 15. In at least one embodiment, process 1500 may leverage services and/or hardware as described herein. In at least one embodiment, refined models 1512 generated by process 1500 may be executed by a deployment system for one or more containerized applications in deployment pipelines 1510.

In at least one embodiment, model training 1514 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, deleted, and/or replaced with an updated or new output or loss layer(s). In at least one embodiment, initial model 1504 may have previously fine-tuned parameters (e.g., weights and/or biases) that remain from prior training, so training or retraining 1514 may not take as long or require as much processing as training a model from scratch. In at least one embodiment, during model training, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained model(s) 1506 may be stored in a data store, or registry. In at least one embodiment, pre-trained model(s) 1506 may have been trained, at least in part, at one or more facilities other than a facility executing process 1500. In at least one embodiment, to protect privacy and rights of patients, subjects, or clients of different facilities, pre-trained model(s) 1406 may have been trained, on-premise, using customer or patient data generated on-premise. In at least one embodiment, pre-trained model(s) 1506 may be trained using a cloud and/or other hardware, but confidential, privacy protected patient data may not be transferred to, used by, or accessible to any components of a cloud (or other off premise hardware). In at least one embodiment, where a pre-trained model(s) 1506 is trained at using patient data from more than one facility, pre-trained model(s) 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model(s) 1506 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select pre-trained model(s) 1506 to use with an application. In at least one embodiment, pre-trained model(s) 1506 may not be optimized for generating accurate results on customer dataset 1506 of a facility of a user (e.g., based on patient diversity, demographics, types of medical imaging devices used, etc.). In at least one embodiment, prior to deploying a pre-trained model into a deployment pipeline for use with an application(s), pre-trained model(s) 1506 may be updated, retrained, and/or fine-tuned for use at a respective facility.

In at least one embodiment, a user may select pre-trained model(s) 1506 that is to be updated, retrained, and/or fine-tuned, and this pre-trained model may be referred to as initial model 1504 for a training system within process 1500. In at least one embodiment, a customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by model training system 1304. In at least one embodiment, ground truth data may be generated, at least in part, by clinicians, scientists, doctors, practitioners, at a facility.

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1510 may interact with a GUI via computing device 1508 to edit or fine-tune (auto) annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained models in a model registry to be selected by another facility. In at least one embodiment, this process may be completed at any number of facilities such that refined model 1512 may be further refined on new datasets any number of times to generate a more universal model.

Figure 15B:
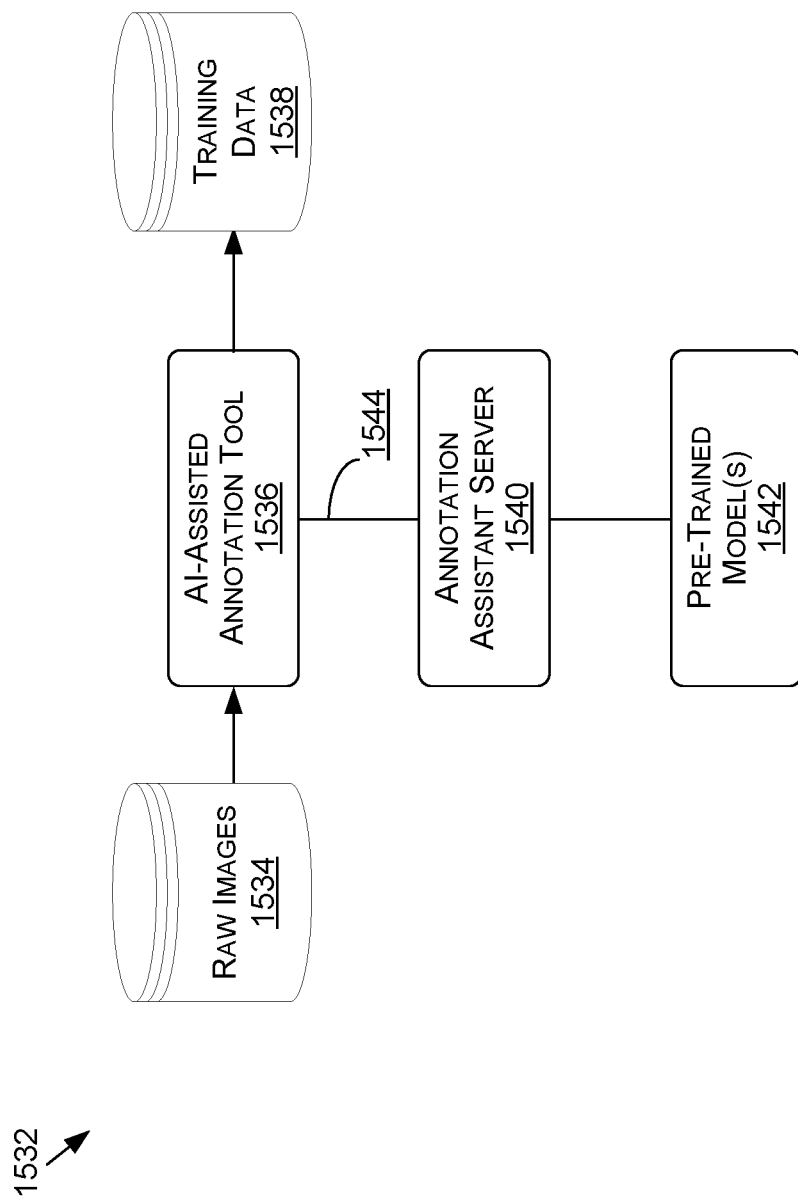

FIG. 15B is an example illustration of a client-server architecture 1532 to enhance annotation tools with pre-trained annotation model(s) 1542, in accordance with at least one embodiment. In at least one embodiment, AI-assisted annotation tool 1536 may be instantiated based on a client-server architecture 1532. In at least one embodiment, AI-assisted annotation tool 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (e.g., API Call 1544) to a server, such as an annotation assistant server 1540 that may include a set of pre-trained model(s) 1542 stored in an annotation model registry, for example. In at least one embodiment, an annotation model registry may store pre-trained model(s) 1542 (e.g., machine learning models, such as deep learning models) that are pre-trained to perform AI-assisted annotation 1310 on a particular organ or abnormality. These models may be further updated by using training pipelines. In at least one embodiment, pre-installed annotation tools may be improved over time as new labeled data is added.

Various embodiments can be described by the following clauses:

1. A computer-implemented method, comprising:
   receiving information for a first plurality of compute tasks performed to render an image; generating a resource dependency graph based on dependencies determined between the first plurality of compute tasks;
   identifying one or more optimizations of the resource dependency graph that maintains the dependencies between the first plurality of tasks;
   causing the image to be re-rendered using a second plurality of tasks, the second plurality of tasks being determined using the resource dependency graph with at least one optimization of the one or more optimizations;

determining that a time required to execute the second plurality of tasks to re-render the image, using the at least one optimization, is less than a time required to execute the first plurality of tasks to render the image; and providing information about the at least one optimization for use in rendering at least one subsequent image.

2. The computer-implemented method of clause 1, further comprising: receiving the information for the first plurality of compute tasks through an interception of a series of application programming interface (API) calls of a rendering application.

3. The computer-implemented method of clause 1, wherein identifying the one or more optimizations further comprises:
using one or more optimization heuristics to identify the one or more optimizations, the one or more optimization heuristics including heuristics for at least one of asynchronous compute opportunity detection, concurrent execution opportunity detection, GPU idle operation reduction, resource switch reduction, or task aggregation.

4. The computer-implemented method of clause 1, wherein identifying the one or more optimizations further comprises:
identifying at least one optimization of the one or more optimizations further based on identification of a plurality of resources used to perform the first plurality of tasks.

5. The computer-implemented method of clause 1, further comprising: providing the information about the time to re-render the image with at least one optimization to the resource dependency graph.

6. The computer-implemented method of clause 1, further comprising:
causing at least one graph alteration corresponding to at least one optimization of the resource dependency graph to be performed automatically or manually.

7. The computer-implemented method of claim 6, wherein the at least one graph alteration includes at least one of a moving, reordering, deleting, combination, or parallelization of one or more tasks in the resource dependency graph.

8. The computer-implemented method of clause 1, further comprising:
reducing a number of optimizations of the one or more optimizations to be tested by identifying equivalent graph alterations and selecting one of the equivalent graph alterations for testing.

9. A processor, comprising:
one or more circuits to:
generate a resource dependency graph based in part on dependencies between a first plurality of tasks identified during rendering of an image;
identify at least one optimization of the resource dependency graph that maintains the dependencies between the first plurality of tasks;
cause the image to be re-rendered using a second plurality of tasks determined at least using the resource dependency graph with the at least one optimization;
measure the time to re-render the image using the at least one optimization; and provide information about the at least one optimization for use in rendering at least one subsequent image.

10. The processor of clause 9, wherein the one or more circuits are further to: receive the information for the first plurality of compute tasks through an interception of a series of application programming interface (API) calls of a rendering application.

11. The processor of clause 9, wherein the one or more circuits are further to: use one or more optimization heuristics to identify the at least one optimization, the one or more optimization heuristics including heuristics for at least one of asynchronous compute opportunity detection, concurrent execution opportunity detection, GPU idle operation reduction, resource switch reduction, or task aggregation.

12. The processor of clause 9, wherein the one or more circuits are further to: identify the at least one optimization further based on identification of a plurality of resources used to perform the first plurality of tasks.

13. The processor of clause 9, wherein the at least one graph alteration includes at least one of a moving, reordering, deleting, combination, or parallelization of one or more tasks in the resource dependency graph.

14. The processor of clause 9, wherein the processor is comprised in at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a system for performing generative AI operations using a large language model (LLM);
a collaborative content creation platform for 3D assets; or
a system implemented at least partially using cloud computing resources.

15. A system, comprising:
one or more processors to identify one or more optimizations corresponding to a resource dependency graph that maintains dependencies between a plurality of tasks to be performed to render an image, the one or more processors further to cause the image to be re-rendered to determine whether the time to re-render the image with at least one optimization of the one or more optimizations is less than the time to render the image without the at least one optimization, whereby the at least one optimization is allowed to be used for rendering of a subsequent image.

16. The system of clause 15, wherein the one or more processors are further to:
receive the information for the first plurality of compute tasks through an interception of a series of application programming interface (API) calls of a rendering application.

17. The system of clause 15, wherein the one or more processors are further to:
   use one or more optimization heuristics to identify the one or more optimizations, the one or more optimization heuristics including heuristics for at least one of asynchronous compute opportunity detection, concurrent execution opportunity detection, GPU idle operation reduction, resource switch reduction, or task aggregation.
18. The system of clause 15, wherein the one or more processors are further to:
   identify the at least one optimization of the one or more optimizations further based on identification of a plurality of resources used to perform the first plurality of tasks.
19. The system of clause 15, wherein the at least one graph alteration includes at least
   one of a moving, reordering, deleting, combination, or parallelization of one or more tasks in the resource dependency graph.
20. The system of clause 15, wherein the system comprises at least one of:
   a system for performing simulation operations;
   a system for performing simulation operations to test or validate autonomous machine applications;
   a system for performing digital twin operations;
   a system for performing light transport simulation;
   a system for rendering graphical output;
   a system for performing deep learning operations;
   a system implemented using an edge device;
   a system for generating or presenting virtual reality (VR) content;
   a system for generating or presenting augmented reality (AR) content;
   a system for generating or presenting mixed reality (MR) content;
   a system incorporating one or more Virtual Machines (VMs);
   a system implemented at least partially in a data center;
   a system for performing hardware testing using simulation;
   a system for synthetic data generation;
   a system for performing generative AI operations using a large language model (LLM);
   a collaborative content creation platform for 3D assets; or
   a system implemented at least partially using cloud computing resources Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:

receiving information for a first plurality of compute tasks performed to render an image;

generating a resource dependency graph based on dependencies determined between the first plurality of compute tasks;

identifying one or more optimizations of the resource dependency graph that maintains the dependencies between the first plurality of tasks;

causing the image to be re-rendered using a second plurality of tasks, the second plurality of tasks being determined using the resource dependency graph with at least one optimization of the one or more optimizations;

determining that a time required to execute the second plurality of tasks to re-render the image, using the at least one optimization, is less than a time required to execute the first plurality of tasks to render the image; and providing information about the at least one optimization for use in rendering at least one subsequent image.

2. The computer-implemented method of claim 1, further comprising:
receiving the information for the first plurality of compute tasks through an interception of a series of application programming interface (API) calls of a rendering application.

3. The computer-implemented method of claim 1, wherein identifying the one or more optimizations further comprises:
using one or more optimization heuristics to identify the one or more optimizations, the one or more optimization heuristics including heuristics for at least one of asynchronous compute opportunity detection, concurrent execution opportunity detection, GPU idle operation reduction, resource switch reduction, or task aggregation.

4. The computer-implemented method of claim 1, wherein identifying the one or more optimizations further comprises:
identifying at least one optimization of the one or more optimizations further based on identification of a plurality of resources used to perform the first plurality of tasks.

5. The computer-implemented method of claim 1, further comprising:
providing the information about the time to re-render the image with at least one optimization to the resource dependency graph.

6. The computer-implemented method of claim 1, further comprising:
causing at least one graph alteration corresponding to at least one optimization of the resource dependency graph to be performed automatically or manually.

7. The computer-implemented method of claim 6, wherein the at least one graph alteration includes at least one of a moving, reordering, deleting, combination, or parallelization of one or more tasks in the resource dependency graph.

8. The computer-implemented method of claim 1, further comprising:
reducing a number of optimizations of the one or more optimizations to be tested by identifying equivalent graph alterations and selecting one of the equivalent graph alterations for testing.

9. A processor, comprising:
one or more circuits to:
generate a resource dependency graph based in part on dependencies between a first plurality of tasks identified during rendering of an image;
identify at least one optimization of the resource dependency graph that maintains the dependencies between the first plurality of tasks;
cause the image to be re-rendered using a second plurality of tasks determined at least using the resource dependency graph with the at least one optimization;
measure the time to re-render the image using the at least one optimization; and
provide information about the at least one optimization for use in rendering at least one subsequent image.

10. The processor of claim 9, wherein the one or more circuits are further to:
receive the information for the first plurality of compute tasks through an interception of a series of application programming interface (API) calls of a rendering application.

11. The processor of claim 9, wherein the one or more circuits are further to:
use one or more optimization heuristics to identify the at least one optimization, the one or more optimization heuristics including heuristics for at least one of asynchronous compute opportunity detection, concurrent execution opportunity detection, GPU idle operation reduction, resource switch reduction, or task aggregation.

12. The processor of claim 9, wherein the one or more circuits are further to:
identify the at least one optimization further based on identification of a plurality of resources used to perform the first plurality of tasks.

13. The processor of claim 9, wherein the at least one graph alteration includes at least one of a moving, reordering, deleting, combination, or parallelization of one or more tasks in the resource dependency graph.

14. The processor of claim 9, wherein the processor is comprised in at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a system for performing generative AI operations using a large language model (LLM);
a collaborative content creation platform for 3D assets; or
a system implemented at least partially using cloud computing resources.

15. A system, comprising:
one or more processors to identify one or more optimizations corresponding to a resource dependency graph that maintains dependencies between a plurality of tasks to be performed to render an image, the one or more processors further to cause the image to be re-rendered to determine whether the time to re-render the image with at least one optimization of the one or more optimizations is less than the time to render the image without the at least one optimization, whereby the at least one optimization is allowed to be used for rendering of a subsequent image.

16. The system of claim 15, wherein the one or more processors are further to:
receive the information for the first plurality of compute tasks through an interception of a series of application programming interface (API) calls of a rendering application.

17. The system of claim 15, wherein the one or more processors are further to:
use one or more optimization heuristics to identify the one or more optimizations, the one or more optimization heuristics including heuristics for at least one of asynchronous compute opportunity detection, concurrent execution opportunity detection, GPU idle operation reduction, resource switch reduction, or task aggregation.

18. The system of claim 15, wherein the one or more processors are further to:
identify the at least one optimization of the one or more optimizations further based on identification of a plurality of resources used to perform the first plurality of tasks.

19. The system of claim 15, wherein the at least one graph alteration includes at least one of a moving, reordering, deleting, combination, or parallelization of one or more tasks in the resource dependency graph.

20. The system of claim 15, wherein the system comprises at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a system for performing generative AI operations using a large language model (LLM);
a collaborative content creation platform for 3D assets; or
a system implemented at least partially using cloud computing resources.

* * * * *